(12) United States Patent
Kato et al.

(10) Patent No.: US 7,259,746 B2
(45) Date of Patent: Aug. 21, 2007

(54) DISPLAY APPARATUS AND METHOD FOR AUTOMOTIVE VEHICLE

(75) Inventors: Kazuhito Kato, Yokohama (JP); Satoshi Kitazaki, Yokohama (JP); Yoshiharu Nakaji, Yokohama (JP); Shunsuke Hijikata, Yokohama (JP); Akinari Hirao, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 891 days.

(21) Appl. No.: 10/070,951

(22) PCT Filed: Sep. 26, 2001

(86) PCT No.: PCT/JP01/08342

§ 371 (c)(1),
(2), (4) Date: Mar. 13, 2002

(87) PCT Pub. No.: WO02/40942

PCT Pub. Date: May 23, 2002

(65) Prior Publication Data
US 2003/0025615 A1 Feb. 6, 2003

(30) Foreign Application Priority Data
Nov. 14, 2000 (JP) ............................. 2000-346694

(51) Int. Cl.
*G09G 5/00* (2006.01)
(52) U.S. Cl. .................. 345/156; 345/204; 340/995.14
(58) Field of Classification Search ................ 345/156, 345/208, 204; 701/208, 212, 224; 340/995.14
See application file for complete search history.

(56) References Cited

U.S. PATENT DOCUMENTS

| 5,793,310 | A | * | 8/1998 | Watanabe et al. ...... 340/995.14 |
| 5,917,436 | A | * | 6/1999 | Endo et al. ............ 340/995.14 |
| 5,925,091 | A | * | 7/1999 | Ando ......................... 701/212 |
| 6,032,098 | A | * | 2/2000 | Takahashi et al. .......... 701/210 |
| 6,088,649 | A | * | 7/2000 | Kadaba et al. .............. 701/201 |
| 6,128,571 | A | * | 10/2000 | Ito et al. ..................... 701/201 |

(Continued)

FOREIGN PATENT DOCUMENTS

| EP | 0 953 826 A | 11/1999 |
| EP | 0 953 826 A2 | 11/1999 |

(Continued)

*Primary Examiner*—Richard Hjerpe
*Assistant Examiner*—Kimnhung Nguyen
(74) *Attorney, Agent, or Firm*—McDermott Will & Emery LLP

(57) ABSTRACT

In display apparatus and method for an automotive vehicle in which an image display is mounted, a road map data image is stored in a storage medium, a mark representing the present position of the vehicle is superimposed on the road map data image, the road map data image is rotated on an image screen of the image display in accordance with a traveling direction of the vehicle while displaying the road map data image on an image screen of the image display, and a display form of the displayed road map data image is varied between a region of the road map data image which is near to a displayed position at which the vehicle is present and another region thereof which is remote from the displayed position thereof while rotating the road map data image on the image screen of the image display section.

18 Claims, 28 Drawing Sheets
(14 of 28 Drawing Sheet(s) Filed in Color)

U.S. PATENT DOCUMENTS

| | | | |
|---|---|---|---|
| 6,470,265 B1 * | 10/2002 | Tanaka | 701/208 |
| 6,505,503 B1 * | 1/2003 | Teresi et al. | 73/117 |
| 2001/0039474 A1 * | 11/2001 | Hayashi et al. | 701/208 |

FOREIGN PATENT DOCUMENTS

| | | |
|---|---|---|
| JP | 5-210348 | 8/1993 |
| JP | 10-148534 A | 6/1998 |

* cited by examiner

CIRCUMFERENTIAL VELOCITY (mm/s)   (AV)( D )( R )

CIRCUMFERENTIAL VELOCITY (mm/s)   (AV)( D )( R )

FIG.26A

○ ··· START OF ROTATION OF ROAD MAP DATA IMAGE
● ··· END OF ROTATION OF ROAD MAP DATA IMAGE

DISPLAY APPARATUS AND METHOD FOR AUTOMOTIVE VEHICLE

TECHNICAL FIELD

The present invention relates to display apparatus and method for an automotive vehicle such as, so-called, car navigation system and method. The present invention, more particularly, relates to a technique for improving a visibility of an image displayed on an image screen of a display.

BACKGROUND ART

A Japanese Patent Application First Publication No. Heisei 10-148534 published on Jun. 2, 1998 exemplifies a previously proposed vehicular display apparatus. In the previously proposed vehicular display apparatus disclosed in the above-identified Japanese Patent Application First Publication, in a case where a vehicular steering wheel is steered toward a center of the vehicle in order to turn the vehicle, the image screen of the display is switched to a state in which a visibility of the whole image screen of the display is lowered so that a vehicular driver does not feel troublesome.

DISCLOSURE OF THE INVENTION

However, since, in the previously proposed vehicular display apparatus disclosed in the above-identified Japanese Patent Application First Publication, the visibility of the whole display image screen is modified, there is a possibility that the vehicular driver still feels troublesome.

It is, therefore, an object of the present invention to provide display apparatus and method for an automotive vehicle which meet a vehicular driving sense of the vehicular driver while improving a visibility of the displayed image.

According to one aspect of the present invention, there is provided a display apparatus for an automotive vehicle, comprising: an image display section; a present position measuring section that measures a present position of the vehicle; a road map storing section that stores a road map data image; a superimpose processing section that superimposes a mark representing the present position of the vehicle on the road map data image to display the road map data image on which the mark is superimposed through the image display section; and display control section that rotates the road map data image displayed on an image screen of the image display section in accordance with a traveling direction of the vehicle and varies a display form of the displayed road map data image between a region of the road map data image which is near to a displayed position at which the vehicle is present and another region of the road map data image which is remote from the displayed position thereof when rotating the road map data image on the image screen displayed on the image display section.

This disclosure of the invention does not necessarily describe all necessary features so that the invention may also be a sub-combination of these described features.

BRIEF DESCRIPTION OF THE DRAWINGS

The file of this patent contains at least one drawing executed in color. Copies of this patent or patent application publication with color drawing(s) will be provided by the Patent and Trademark Office upon request and payment of the necessary fee.

FIG. 26A is a timing chart representing start and end of a turning of the vehicle.

BEST MODE FOR CARRYING OUT THE INVENTION

Figure 1:
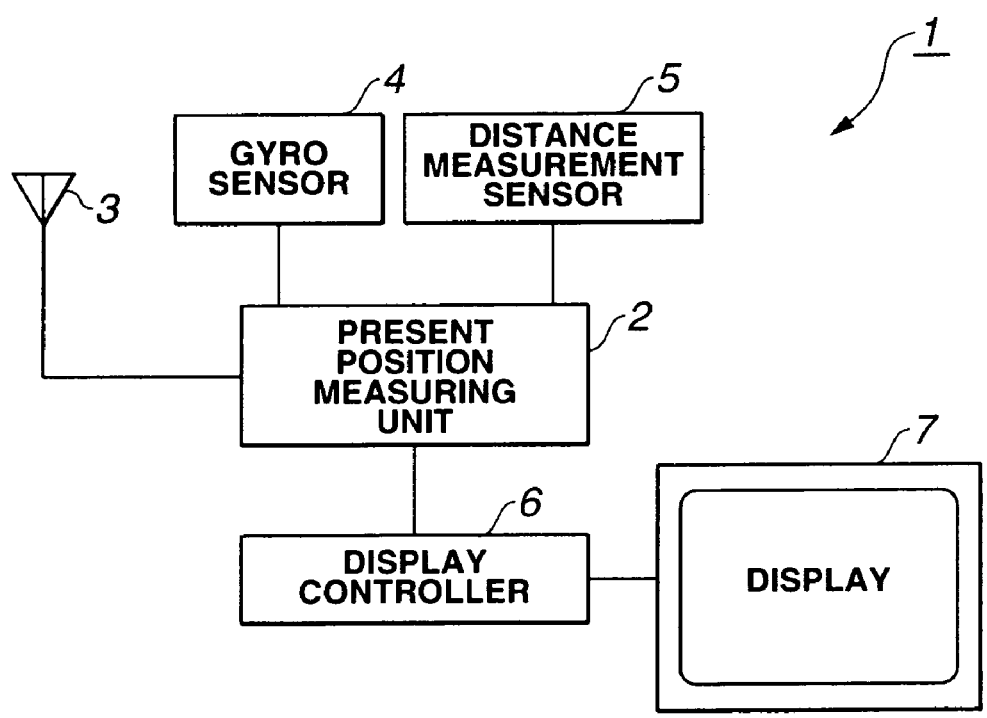
FIG. 1 is a block diagram representing a structure of a vehicular display apparatus according to the present invention related to each of first, second, third, fourth, fifth, and sixth preferred embodiments.

Reference will hereinafter be made to the drawings in order to facilitate a better understanding of the present invention FIG. 1 shows a whole configuration of a display apparatus for an automotive vehicle (hereinafter, also referred to as a vehicular display apparatus) related to each preferred embodiment according to the present invention. As shown in FIG. 1, vehicular display apparatus 1 includes: a present position measuring unit 2 which measures a present position of the vehicle (hereinafter, also referred to as a host vehicle); a GPS (Global Positioning System) antenna 2 which receives GPS signals radiated from a plurality of position measuring satellites; a gyro sensor 4 which measures a traveling direction of the host vehicle; a distance measurement sensor 5 which measures a running distance of the vehicle; a display (corresponding to image display means) 7; and a display controller 6 which controls an image display onto display 7.

Present position measuring unit 2 measures an absolute position of the host vehicle on the basis of a position measurement information received from GPS antenna 3. In addition, in a case where the GPS signals cannot be received, the present position of the vehicle is measured using a self-contained navigation (SCN) method based on the position measurement data obtained from gyro sensor 4 and distance sensor 5. It is noted that display 7 may be constituted by a liquid crystal display, present position measuring unit 2 and display controller 7 may be constituted by a microcomputer and its peripheral circuit.

Figure 2:
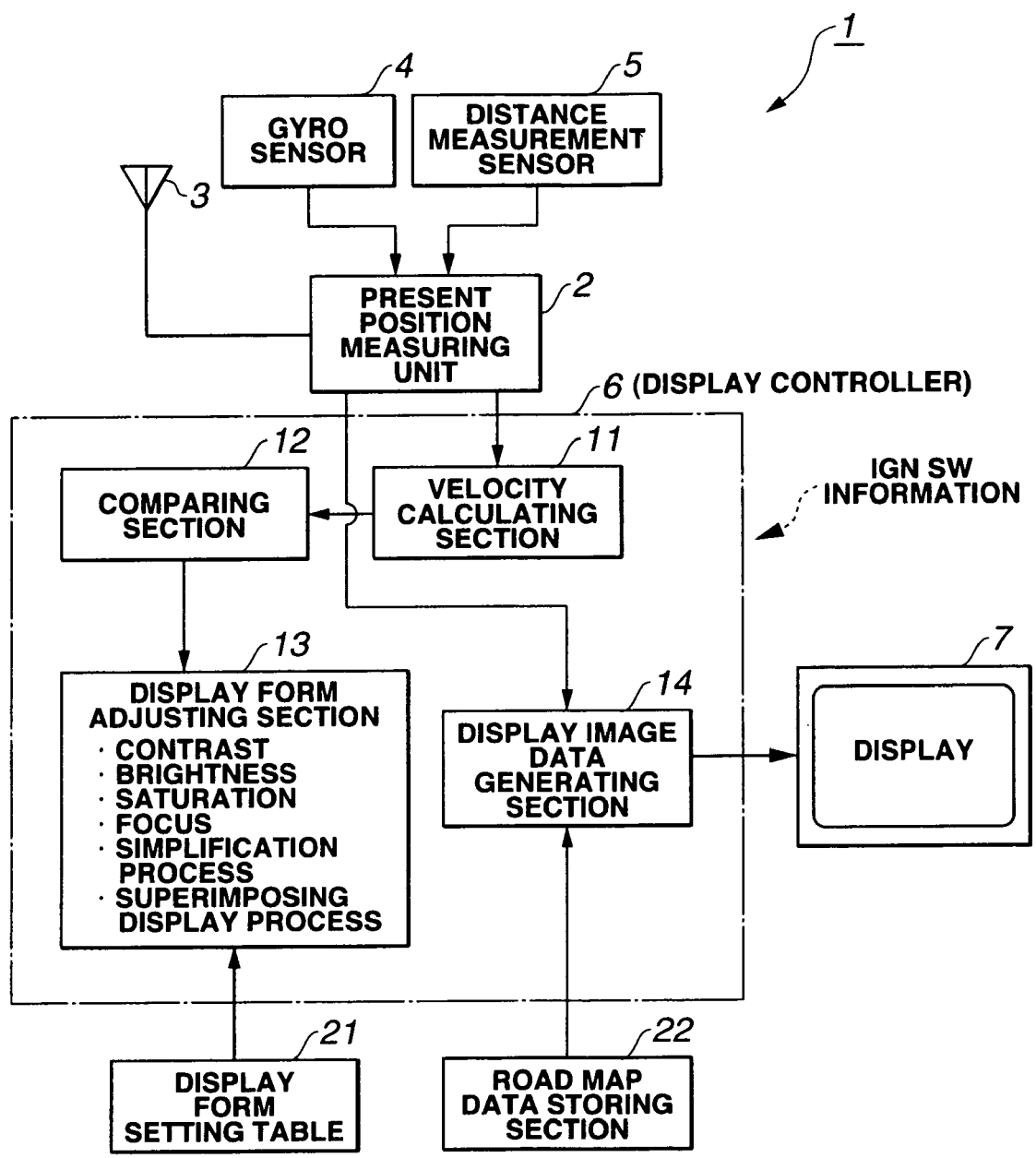
FIG. 2 is a block diagram representing a more detailed structure of vehicular display apparatus related to the first, third, and fourth preferred embodiments.

FIG. 2 shows a functional block diagram representing a structure of the vehicular display apparatus 1 related to each of first, second, third, fourth, and fifth preferred embodiments according to the present invention. As shown in FIG. 2, display controller (corresponding to display control means) 6 includes a velocity calculating section 11; an (arithmetically) comparing section 12; a display form adjusting section 13; and a display image data generating section 14. In addition, display controller 6 includes a display form setting table which stores setting data needed when the display form adjusting section 13 adjusts the display form; and a road map data storing section 22 which stores a road map data image placed in a proximity to a running position of the host vehicle.

Velocity calculating section 11 detects a circumferential velocity V1 at various points of places (given spots) on the road map data image displayed on display 7 along with a turn of the vehicle when the vehicular driver steers a vehicular steering wheel to turn the vehicle so that a traveling direction of the vehicle measured by present position measuring section 2 is changed. In addition, velocity calculating section 11 has a function to calculate a turning angle θ1 of the vehicle within a predetermined period of time when the traveling direction of the vehicle is changed, as will be described later in each of the third and fourth preferred embodiments.

In comparing section 12, a reference value Vref of the circumferential velocity is preset. Comparing section 12 compares the circumferential velocity V1 derived by velocity calculating section 11 with reference value Vref to determine whether the circumferential velocity V1 is larger than reference value Vref thereof. A signal indicating a result of the determination described above is supplied to display form adjusting section 13. In addition, another reference value θref of a turning angle of the vehicle with another predetermined period of time is preset in comparing section 12 as will be described later in each of the third and fourth preferred embodiments according to the present invention. Then, comparing section 12 compares the turning angle θ1 derived by velocity calculating section 11 with reference value θref.

Display form adjusting section 13 carries out a proper modification (variation) of a display form of the road map data image displayed on display 7 when comparing section 12 determines that the circumferential velocity V1 of the image on display 7 is larger than a reference value Vref of circumferential velocity described above. The display form includes an image contrast, an image brightness, an image saturation, and a simplification (simplifying process) of the displayed image. Display form adjusting section 13 adjusts at least one of display forms of these items on the basis of data stored in display form setting table 21 in such a procedure as will be described later.

Furthermore, display form adjusting section 13 has a function to implement a display process such as to superimpose a road map data image after the traveling direction of the vehicle is changed on that before the traveling direction of the vehicle is changed.

Display image data generating section 14 carries out a process of generating an image to be displayed on display 7 on the basis of road map data read from road map storing section 22, data on the present position of the vehicle and the traveling direction of the vehicle supplied from present position measuring unit 2, and data on various kinds of display forms supplied from display form adjusting section 13. It is noted that road map data storing section 22 may be constituted by an external storage medium and driver therefor.

Next, an operation of the first preferred embodiment of vehicular display apparatus 1 will be described with reference to a flowchart shown in FIG. 3.

At a step ST1, present position measuring section 2 measures the present position of the host vehicle on the basis of data obtained by GPS antenna 3 or by both of distance sensor 5 and gyro sensor 4. At the next step ST2, display image data generating section 14 reads road map data of a surrounding regional area with a point of place at which the vehicle is running as a center from road map data storing section 22. At the next step ST3, display image data generating section 14 superimposes a mark representing the position of the host vehicle on the road map data image. At the next step ST4, display image data generating section 14 generates the image data to be displayed on display 7.

Next, if the vehicular driver steers a steering wheel of the vehicle to change the traveling direction of the vehicle (Yes at a step ST5), display image data generating section 14 rotates the road map data image with the position of the vehicle to be displayed as a center so as to adjust the traveling direction of the vehicle on display 7 to usually indicate the same direction as the actual traveling direction thereof. At the same time, velocity calculating section 11 calculates rotation velocity at various point of places (various given points) on the road map data image along with the steering operation, namely, circumferential velocities V1. It is noted that circumferential velocities V1 can easily be derived on the basis of a rotation velocity of the road map image data and respective distances of the respective points of places to the center of the image (viz., the position of the vehicle).

At a step ST6, comparing section 12 compares the preset reference value Vref of circumferential velocity (Vref is, for example, 50 mm/s (millimeter/second)) with each of circumferential velocities V1 calculated by velocity calculating section 11 to determine whether a position (a point of place) on the road map data image at which corresponding magnitude of circumferential velocity V1 becomes larger than reference value Vref is present on the image screen of display 7. If Yes at step ST6, namely, the above-described position on the road map data image is determined to be present, display form adjusting section 13 then carries out such a process as to adjust the image contrast along with the rotation of road map data image on the image screen of display 7 at the next step ST7. It is noted that although an adjustment on the contrast, as one example, will herein be explained, the adjustment of brightness, saturation, focus, or a combination of these elements is possible.

Figure 4A:
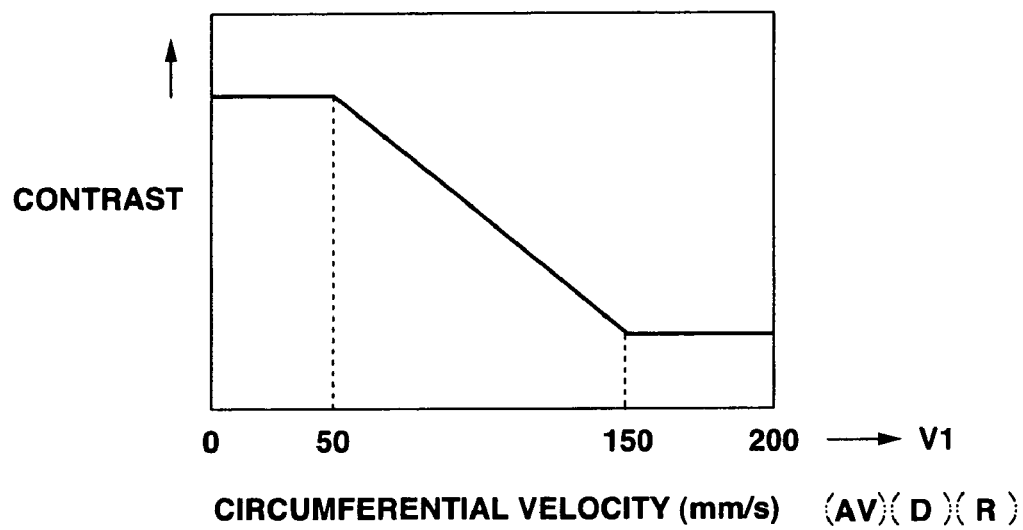
FIGS. 4A and 4B are characteristic curves on an image contrast preset in a display form setting table, respectively.

The adjustment process of the contrast is set in accordance with a characteristic graph stored in display form setting table 21. FIG. 4A shows the characteristic graph representing a relationship between circumferential velocity V1 and contrast. As shown in FIG. 4A, at the position at which the corresponding magnitude of circumferential velocity V1 which is equal to or lower than 50 mm/s, a high contrast (the same contrast as that in an ordinary display) is maintained. Such a processing as reducing the contrast in the form of a first-order function with respect to an increase in circumferential velocity V1 when circumferential velocity V1 falls in a range between 50 mm/s and 150 mm/s is added. Furthermore, if circumferential velocity V1 is in excess of 150 mm/s, such a process as to reduce further the contrast is not carried out.

Figure 3:
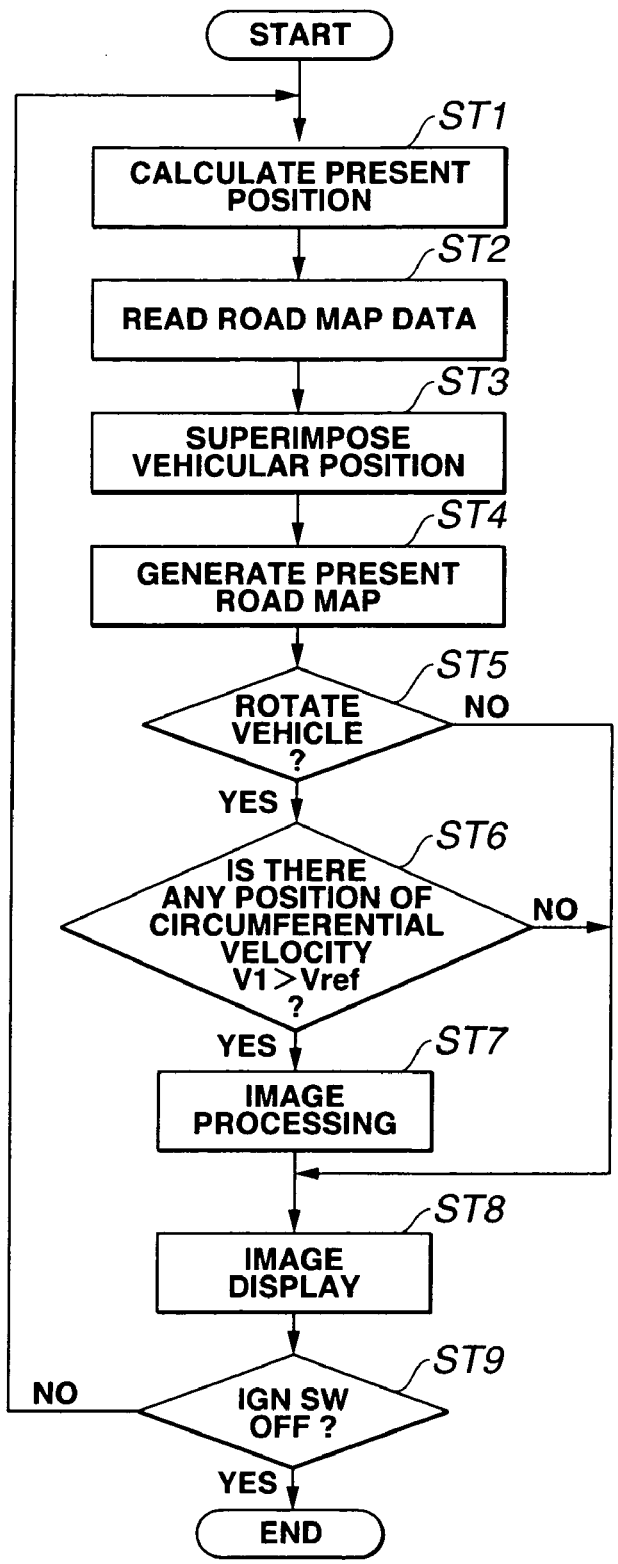
FIG. 3 is a processing flowchart representing a procedure of the vehicular display apparatus in the first preferred embodiment.

Then, the image to which the adjustment process of the contrast is added is displayed on the image screen of display 7 (at a step ST8 in FIG. 3). Thereafter, the above-described series of processes of steps ST1 through ST8 are repeated until an ignition switch of the host vehicle is turned off (Yes at a step ST9).

Figure 5:
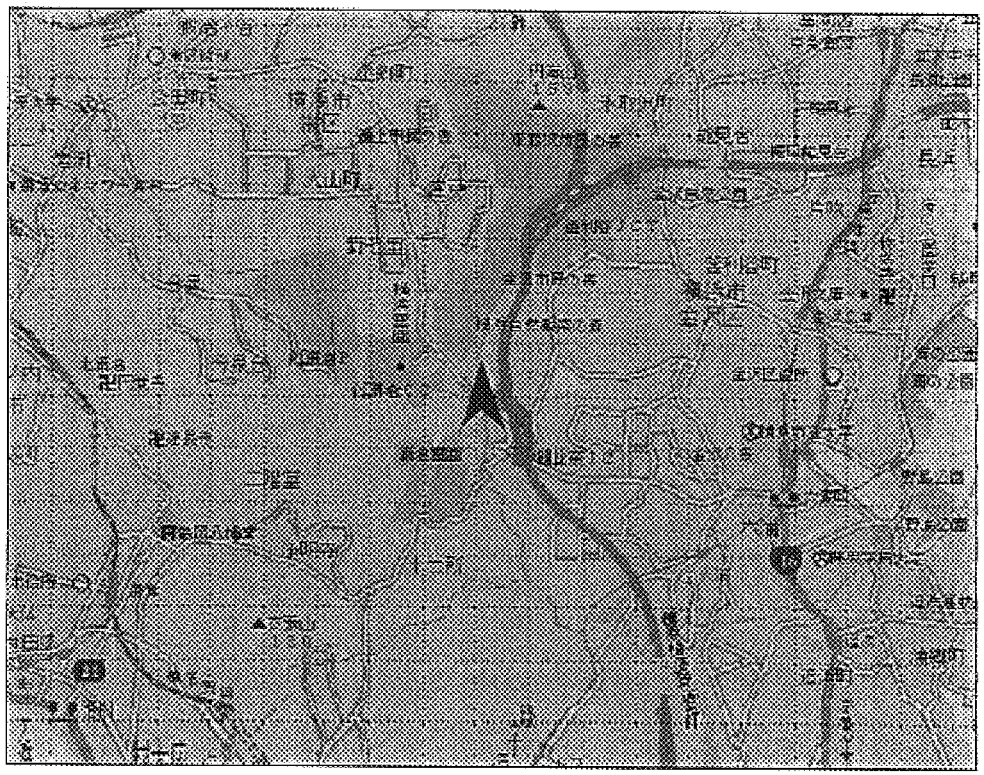
FIG. 5 is a photograph representing a display example of a displayed image on a display when the vehicle has traveled in a straight run.

FIG. 5 shows a display example of display 7 when the vehicle (the present position (including the traveling direction) is represented by an arrowed mark in red) is running ordinarily (or normally).

Figure 6:
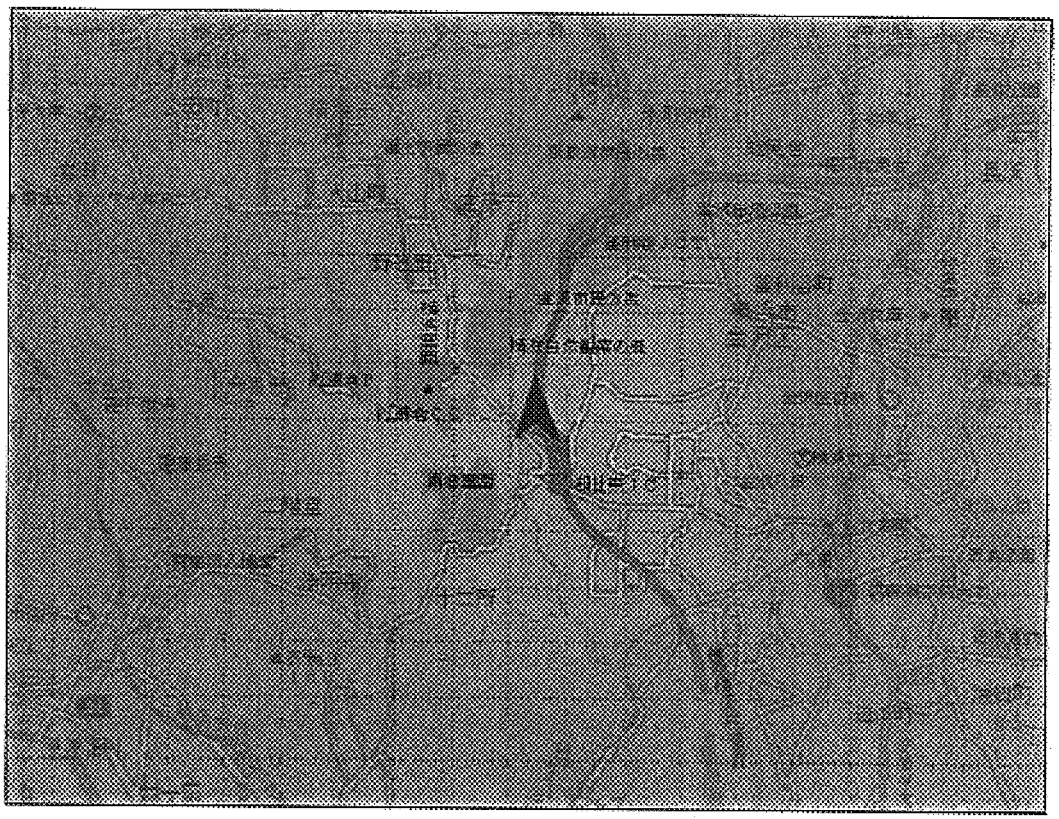
FIG. 6 is a photograph representing a display example of a displayed image on display when a contrast of road map data image is changed during a rotation of road map.

FIG. 6 shows a display example of the image screen of display 7 when the contrast of the road map data image displayed through display 7 is varied when the traveling direction of the host vehicle is changed.

As appreciated from FIGS. 5 and 6, the road map data image displayed on the image screen of display 7 is adjusted in such a manner that, as the road map data image becomes apart from the displayed position of the vehicle (represented by the arrowed mark), the contrast thereon becomes generally lowered. Hence, when the traveling direction of the vehicle is changed at, for example, a traffic intersection, a vehicular occupant (including vehicular driver) can avoid a troublesomeness caused by the rotation of the road map data image on the image screen of display 7 so that the visibility of road map data image can be improved.

Figure 4B:
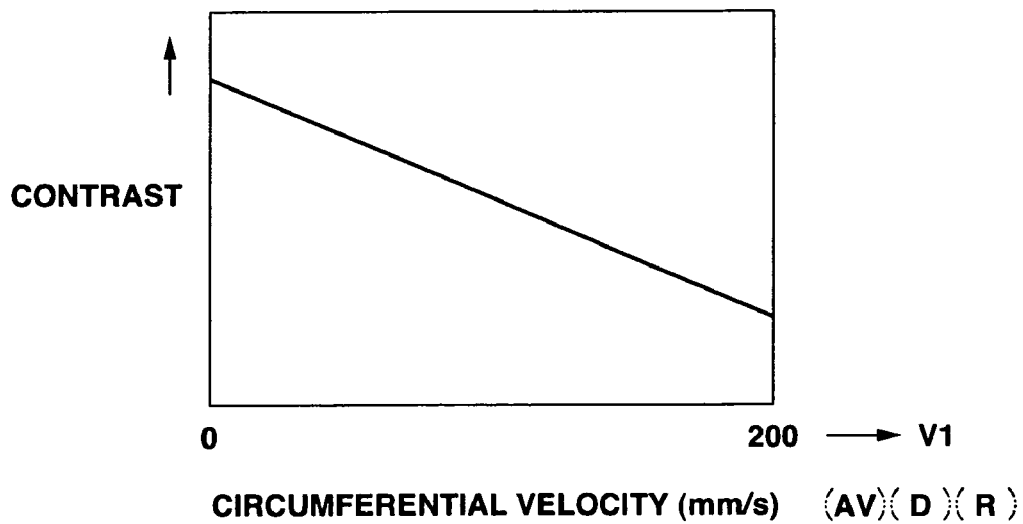

In the first embodiment, the example of setting the relationship between circumferential velocity V1 and contrast of road map data image using the characteristic graph as shown in FIG. 4A has been explained. However, the present invention is not limited to this. That is to say, as shown in a characteristic graph of FIG. 4B, it is also possible to reduce the contrast in the form of the first-order function as a region of the road map data image becomes remote from the rotation center of the road map data image. In this case, such a comparison process as comparing circumferential velocity V1 with reference value Vref of circumferential velocity in the comparing section 12 can be omitted.

In addition, in the first embodiment, circumferential velocity V1 on each of various points of places is derived and the display form such as the contrast is changed on the basis of a magnitude of circumferential velocity V1. However, the present invention is not limited to this. It is possible to vary the display form on the basis of an angular velocity AV of each of the various points of places, each distance D of the various points of places from the rotation center, and a magnitude of a visual sense variation rate R. In this case, each lateral axis in the characteristic graphs of FIGS. 4A and 4B denotes any one of angular velocity AV, distance D from the rotation center, visual sense variation rate R.

In addition, in the first embodiment, display form adjusting section 13 adjusts the contrast on the road map data image. However, as another display form, the brightness, the saturation, and focus of the road map data image may be adjusted.

Figure 7:
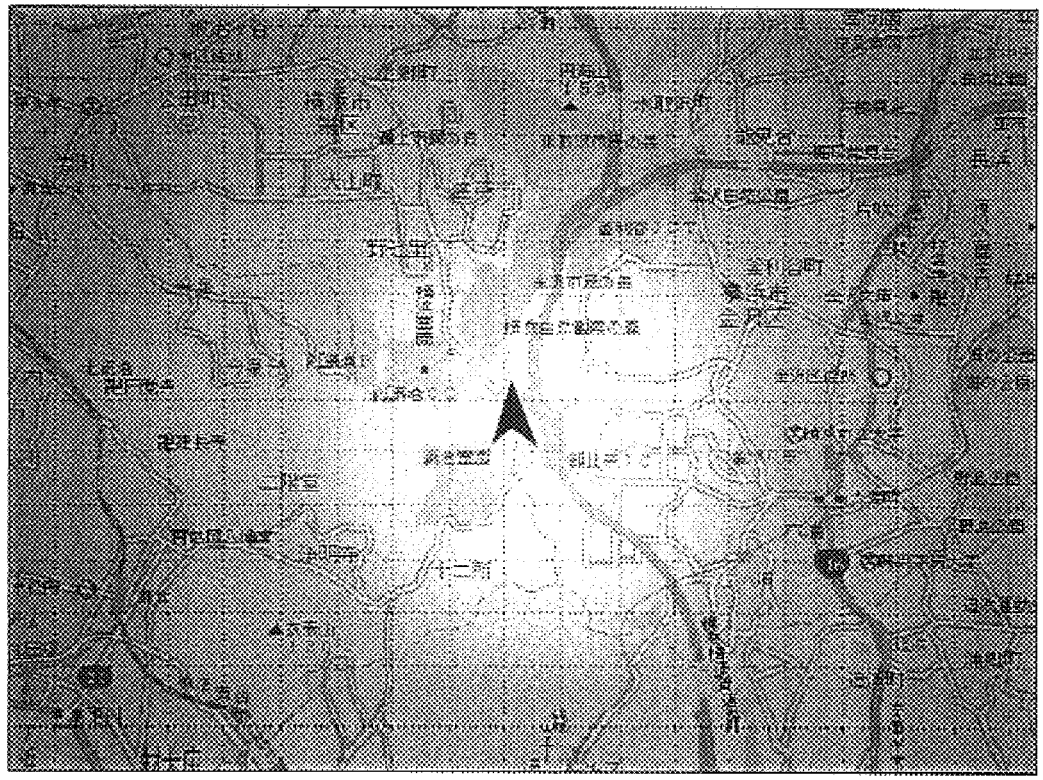
FIG. 7 is a photograph of a display example of a road map data image when a brightness of the road map data image is varied during the rotation of road map data image.

FIG. 7 shows a display example of the image screen of display 7 when the brightness of road map data image is adjusted. As shown in FIG. 7, with the present position of the vehicle on the image screen of display 7 as the center, as the region of the road map image becomes more remote from the present position of the vehicle on the image screen, the brightness of the road map data image becomes lowered. Even in such a display form as shown in FIG. 7, the troublesome feeling that the vehicular occupant gives when the road map data image is rotated can be avoided in the same manner as described above.

Figure 8A:
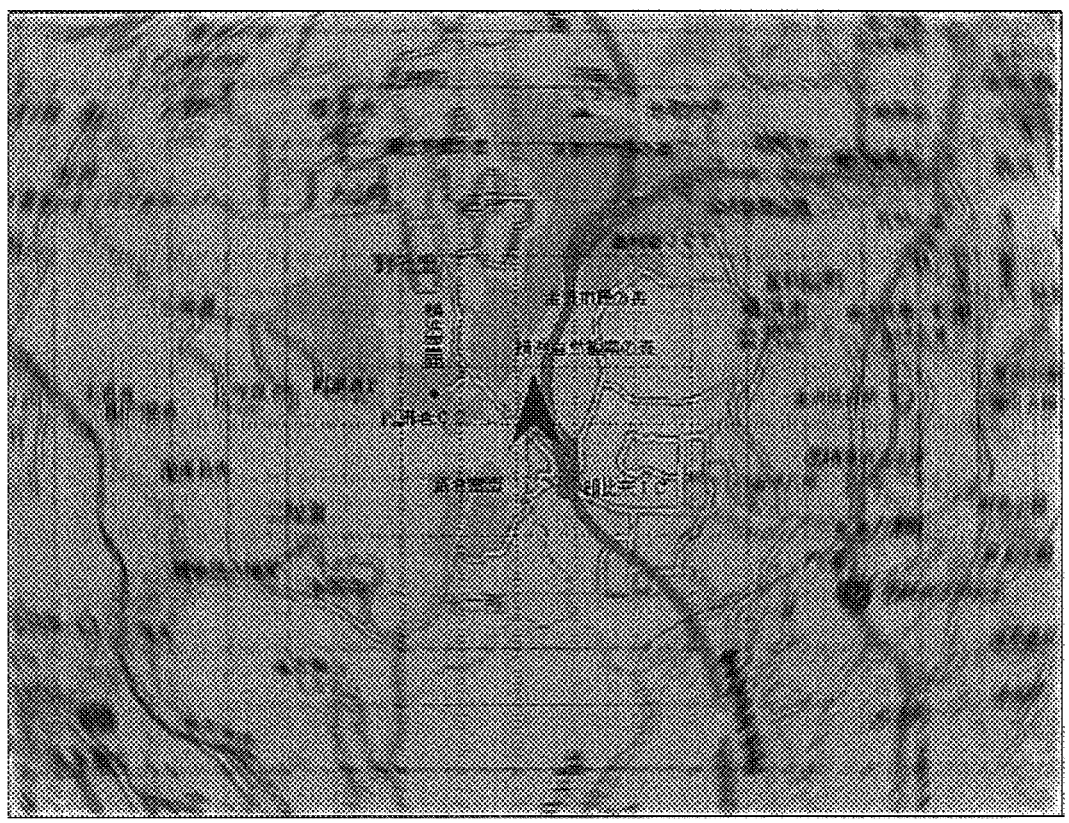
FIG. 8A is a photograph of a display example of the road map data image when a focus of the road map data image is varied during the rotation of road map data image.

Furthermore, FIG. 8A shows a display example of adjusting the focus of the road map data image by display form adjusting section 13 in such a manner that an adjacent portion of the rotation center on the road map data image is clearly displayed and, as the region of the road map data image becomes more remote from the rotation center, the image becomes shaded. In the case of the display form of adjusting the focus, the troublesome feeling that the vehicular occupant gives during the rotation of the road map data image can be avoided and the visibility of the image screen of display 7 can be improved.

Figure 8B:
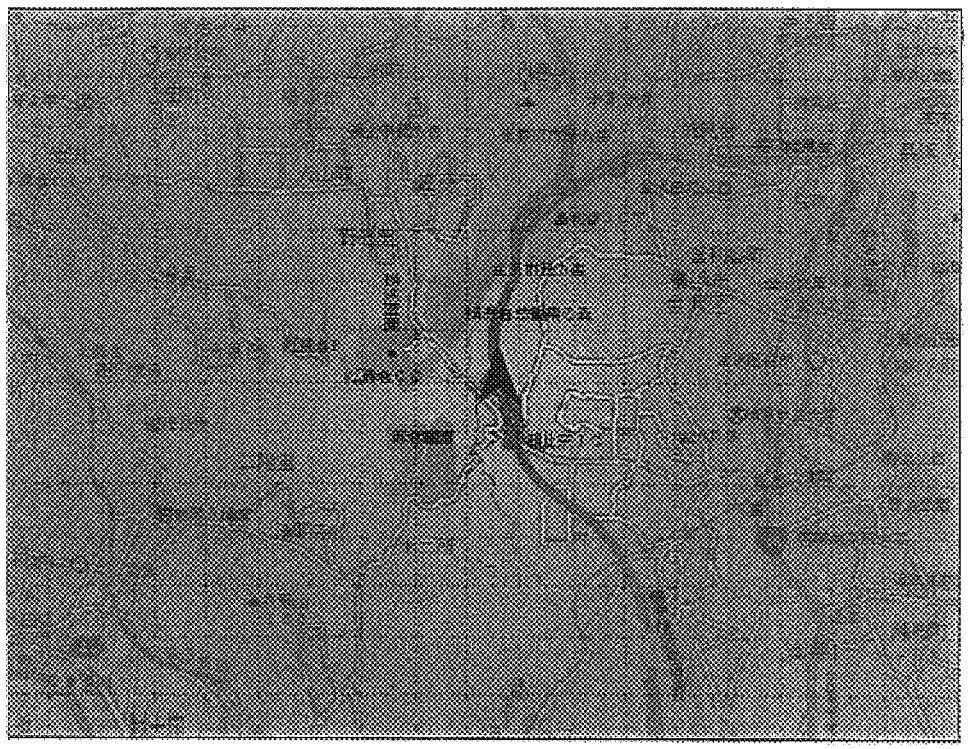
FIG. 8B is a photograph of a display example of the road map data image when a contrast of a region of the road map data image which surrounds an arrowed mark representing a present position of the vehicle is raised and that of another region of the road map data which is remote from the displayed arrowed mark is lowered.
Figure 8C:
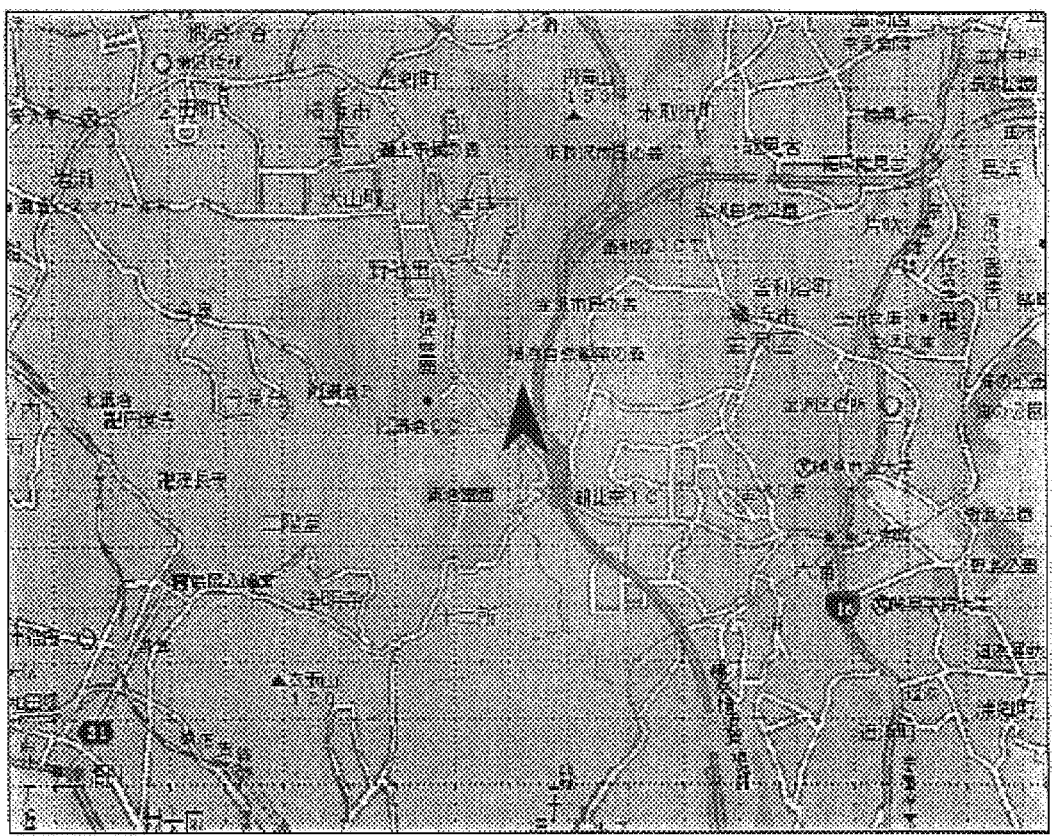
FIG. 8C is a photograph representing a display example of the displayed image when a saturation of a region of the road map data image which surrounds the arrowed mark is lowered as compared with another region thereof which is remote from the arrowed mark.

It is noted that FIG. 8B shows a display example on the display image screen of display 7 in which the contrast of a region of the road map data image which is near to the present position of the vehicle indicated by the arrowed mark is lowered and that of another region thereof which is remote from the center of rotation (arrowed mark position) is raised and FIG. 8C shows a display example on the display image screen of display 7 in which the saturation of the remote region from the position of the arrowed mark is lowered than that of the region near to the arrowed mark position.

In addition, it is possible not only to vary various display forms concentrically (contrast, brightness, saturation, focus, and so forth) with the present position of the vehicle on the road map data image as the center but also to adjust the display form at a desired portion on the road map data image in such a manner as only an upper portion of the display image screen of display 7 or only a lower portion thereof.

In the first preferred embodiment described above, such a series of processes as for a plan view road map data image displayed on the image screen of display 7 has been explained. However, the same series of processes described above are applicable to the road map data image in a form of a bird's eye view (perspective view).

Figure 9:
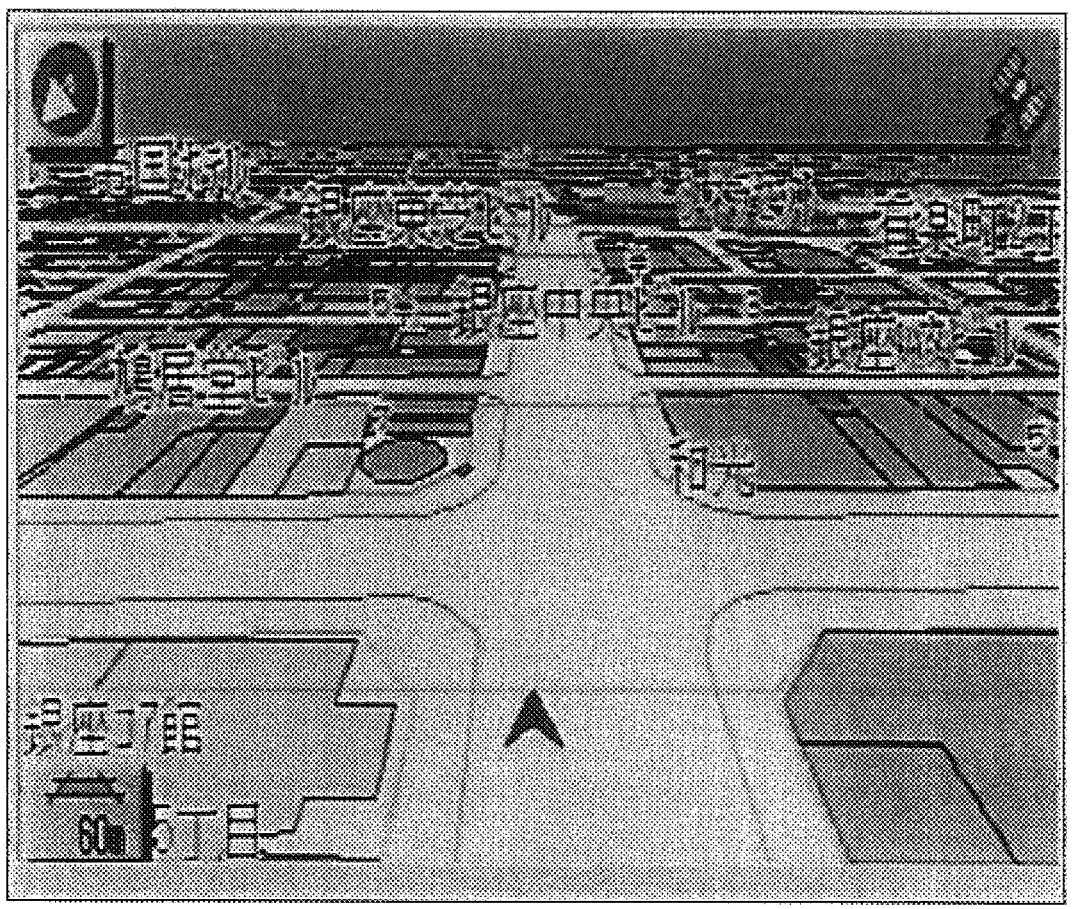
FIG. 9 is a photograph representing an example of the roadmap data image in a form of a bird Is eye view displayed on the display to which the present invention is applicable.
Figure 10:
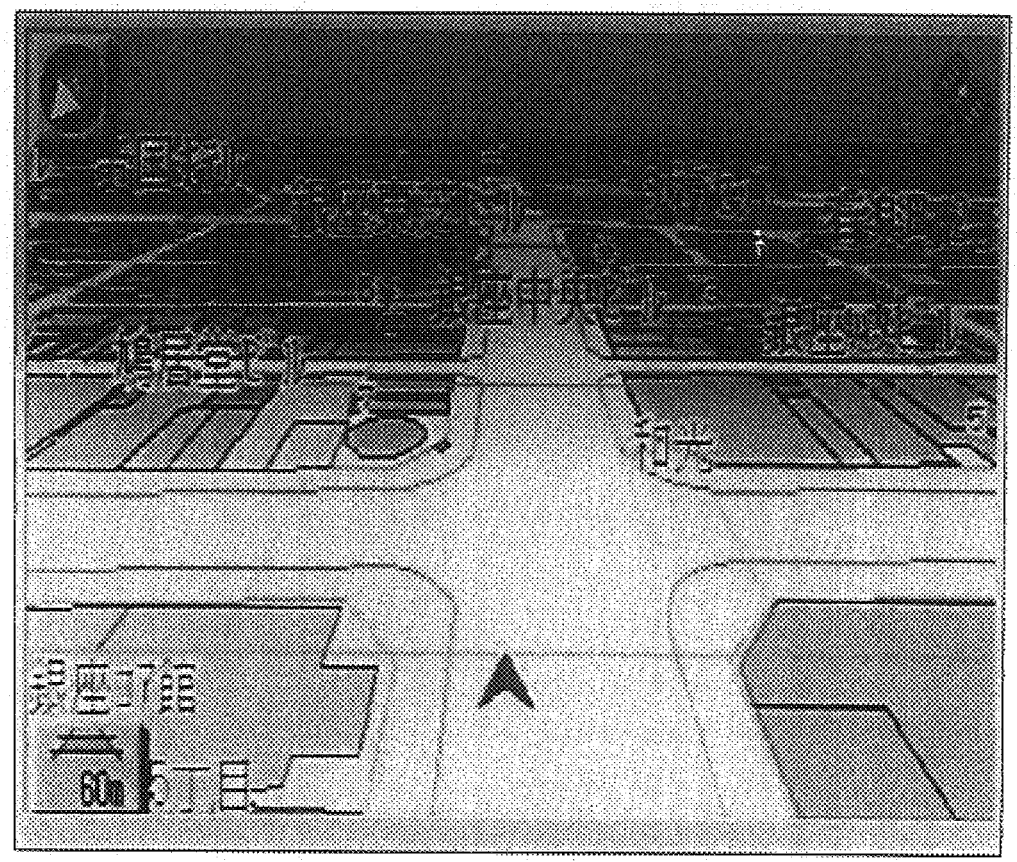
FIG. 10 is a photograph representing an example of the displayed road map data image in the form of the bird's eye view to which a contrast process described in the first embodiment shown in FIGS. 1 and 2 is added.

FIG. 9 shows a display example of the bird's eye view displayed on the image screen of display 7. As shown in FIG. 9, the region of the road map data image in the form of the bird's eye view which is near to the present position of the vehicle indicated by the arrowed mark is displayed approximately three-dimensionally. Then, when the traveling direction of the vehicle is changed and the road map data image in the form of the bird's eye view is rotated, the contrast of the region which is remote from the arrowed mark position (the present position of the host vehicle) is lowered, as shown in FIG. 10. Hence, even in the bird's eye view formed road map data image, the troublesome feeling that the vehicular occupant gives during the rotation of the road map data image can be reduced.

Next, the second preferred embodiment of vehicular display apparatus 1 will be described below.

Figure 11:
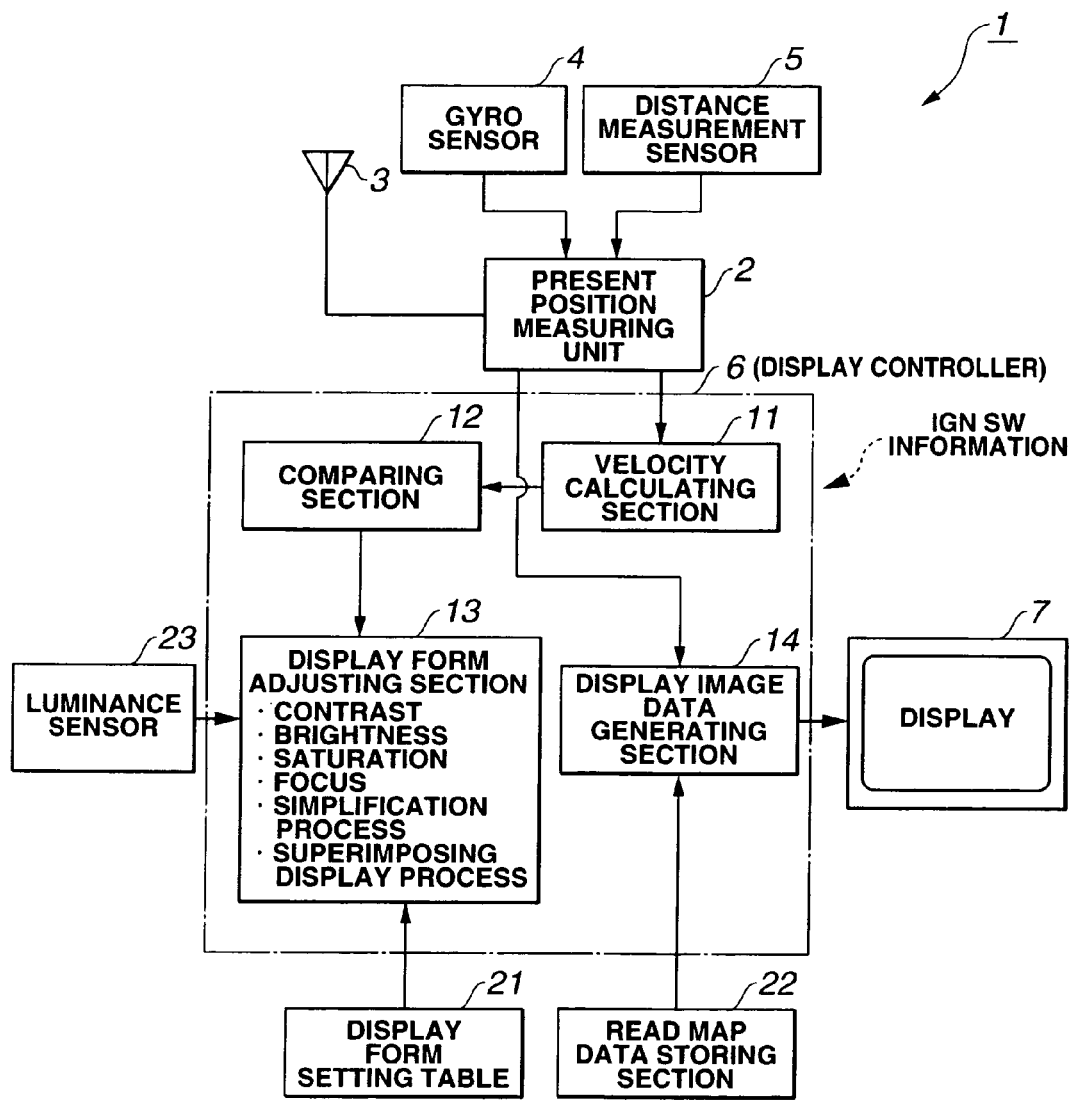
FIG. 11 is a detailed block diagram of the vehicular display apparatus in the second preferred embodiment according to the present invention.

FIG. 11 shows a block diagram representing the structure of vehicular display apparatus 1 in the second preferred embodiment according to the present invention.

As shown in FIG. 11, an addition of a luminance sensor 23 is a point of difference from vehicular display apparatus 1 in the case of the first embodiment shown in FIG. 2.

Luminance sensor 23 is a sensor to detect a luminance of a surrounding area of the vehicle. In this embodiment, the display form of the road map image data on display 7 is adjusted on the basis of detected data of the luminance sensor 23.

Figure 12:
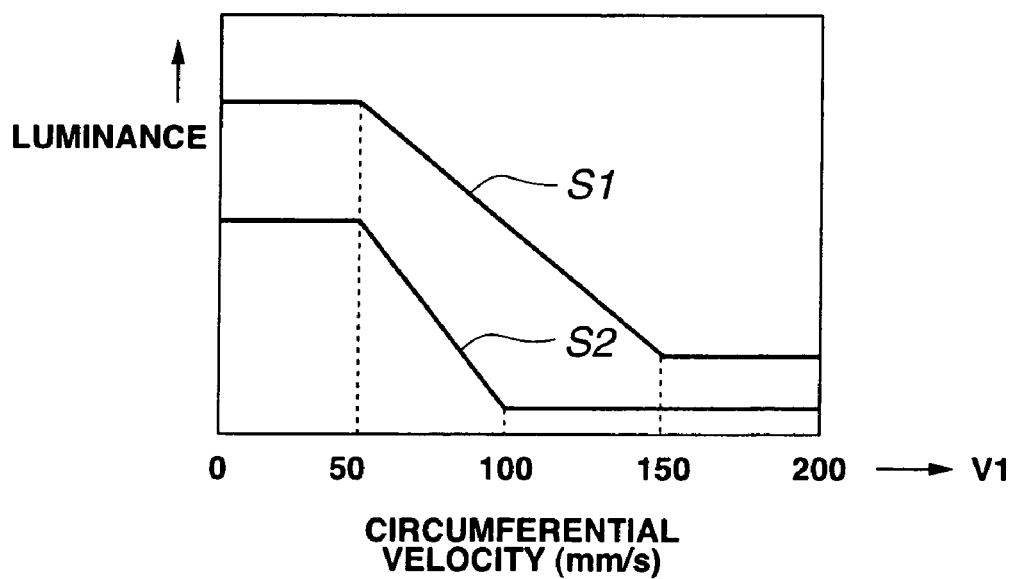
FIG. 12 is a characteristic graph representing an example of varying the display form according to a circumferential velocity V1 and a luminance of an area surrounding the vehicle used in the second embodiment shown in FIG. 11.

In addition, FIG. 12 shows characteristic graphs representing each relationship between circumferential velocity V1 of the rotating roadmap data image and a luminance (it is noted that the contrast, the saturation, or focus may be adopted in place of the luminance) of the road map data image displayed on display 7 and which are set in display form setting table 21. Characteristic graphs representing the relationship between the luminance and circumferential velocity V1 are different between that in the case where the surrounding area of the vehicle is bright and that in the case where the surrounding area of the vehicle is dark.

That is to say, when the luminance of the surrounding area of the vehicle is determined to be equal to or larger than a predetermined level, the brightness is set to be varied gradually like the first-order function in the range of circumferential velocity V1 from 50 to 150 mm/s as shown by a characteristic curve of S1 in FIG. 12. When the luminance of the surrounding area of the vehicle is lower than the predetermined level, the brightness is set to be varied abruptly like the first-order function in the range of circumferential velocity V1 from 50 to 100 mm/s, as shown by another characteristic curve of S2 in FIG. 12.

In the second embodiment described above, in such a case where the luminance of the surrounding area of the vehicle is low as a night time, rainy weather, or run in a tunnel at which the vehicular occupant is particularly easy to feel troublesome, a rate of variation in the brightness with respect to circumferential velocity V1 is set to be large. Hence, the troublesome feeling can be reduced and the visibility of display 7 can be improved. In addition, in such a case where the luminance of the surrounding area is bright as a daytime, the brightness is set to be varied moderately with respect to circumferential velocity V1 so that a required information can accurately be recognized.

Next, the third preferred embodiment of vehicular display apparatus 1 according to the present invention will be described below.

In the third embodiment, the road map data image becomes simplified and displayed as the region of the road map data image becomes more remote from the center of rotation along with the rotation of the road map data image on the image screen of display 7 so that the troublesome feeling that the vehicular occupant gives can be reduced. The structure of the third embodiment is the same as the block diagram shown in FIG. 2 of the first embodiment described above.

Figure 13:
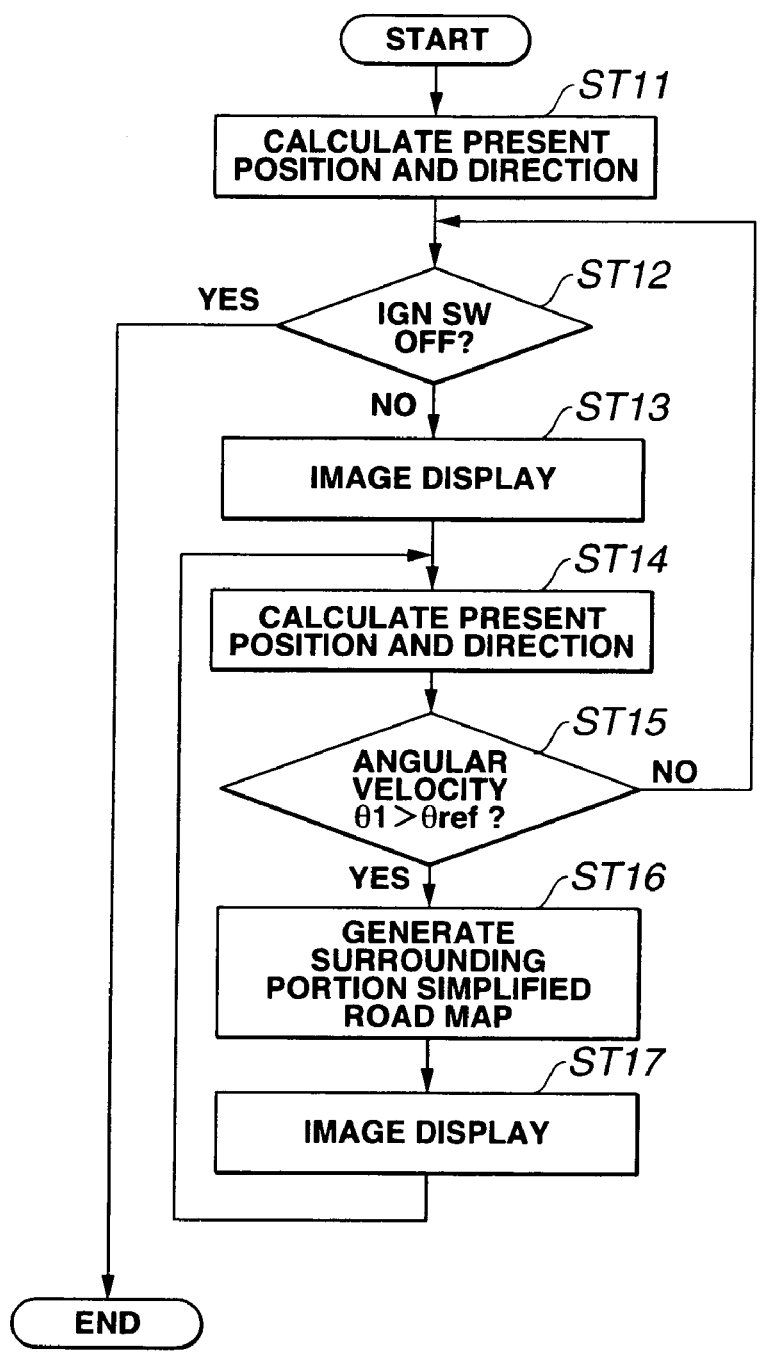
FIG. 13 is an operational flowchart representing a procedure of vehicular display apparatus in the third preferred embodiment according to the present invention.

The operation of vehicular display apparatus 1 in the third embodiment will be explained with reference to the block diagram shown in FIG. 2 and an operational flowchart shown in FIG. 13.

First, at a step ST11, present position measuring unit 2 detects a run position of the vehicle. Then, at a step ST12, display controller 6 determines whether the ignition switch is turned off. If No at step ST12, the routine goes to a step ST13. At step ST13, display image data generating section 14 of display controller 6 carries out such a process as to superimpose and display the present position of the vehicle (the arrowed mark) on the region of the road map data stored in road map data storing section 22 which surrounds the point of place at which the vehicle is running.

Next, at a step ST14, velocity calculating section 11 carries out such a process as to derive a turning angle θ1 of the vehicle within a predetermined period of time on the basis of data on the present position of the vehicle obtained by present position measuring unit 2. Then, at a step ST15, comparing section 12 compares the turning angle θ1 with the preset reference value θref in the comparing section 12 to determine whether θ1>θref. If θ1>θref (Yes) at step ST15, the routine goes to a step ST16. If θ1≦θref (No), the routine jumps to step ST12. At step ST16, display form adjusting section 13 carries out such a process as to simplify the road map data image for the region of the road map data image which is equal to or longer than a predetermined distance value from the center of rotation and to display the other region of the road map data image which is shorter than the predetermined distance value from the rotation center normally without the simplification process. Then, at the next step ST17, the generated image data is displayed on the image screen of display 7.

Figure 14:
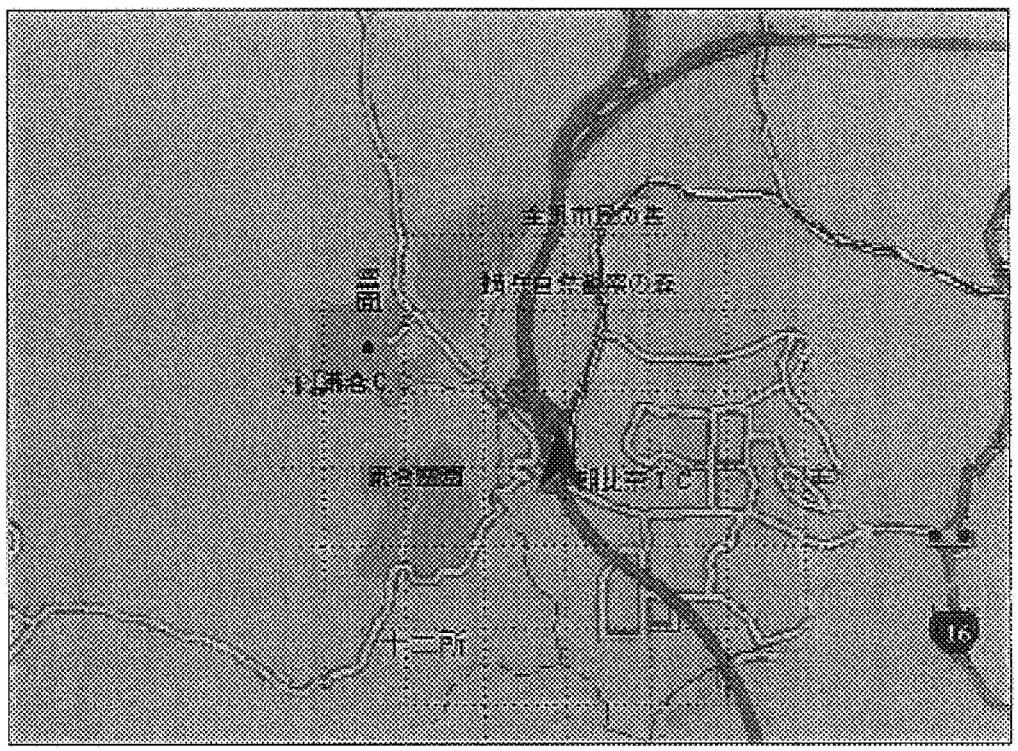
FIG. 14 is a photograph of a display example of display representing a road map data image processed in a simplification process carried out in the third embodiment shown in FIGS. 1 and 13.

FIG. 14 shows a display example representing an example of the road map data image which has been processed under the simplification process as described in the third embodiment.

As appreciated from FIG. 14, for the region of the road map data image which surrounds the displayed present position of the vehicle (arrowed mark, viz., which provides the center of rotation on the road map data image), the road map data image is displayed normally in details and for the other region of the road map data image which is remote from the center of rotation by the predetermined distance value, the road map data image is simplified and displayed. The meaning of this term of simplified is that the detailed road map information is omitted. Hence, the troublesome feeling that the vehicular occupant gives when the road map data image is rotated can be reduced and the visibility of the image screen on display 7 can be improved.

Next, the fourth preferred embodiment of vehicular display apparatus 1 will be described below.

In the fourth embodiment, along with the rotation of the road map data image on the image screen of display 7, the image before the rotation and that after the rotation are superimposed together and displayed and a ratio of this superimposition is varied gradually so that the road map data image on display 7 is rotated without giving the vehicular occupant the troublesome feeling. The structure of vehicular display apparatus 1 in the fourth embodiment is the same as the block diagram of FIG. 2.

Figure 15:
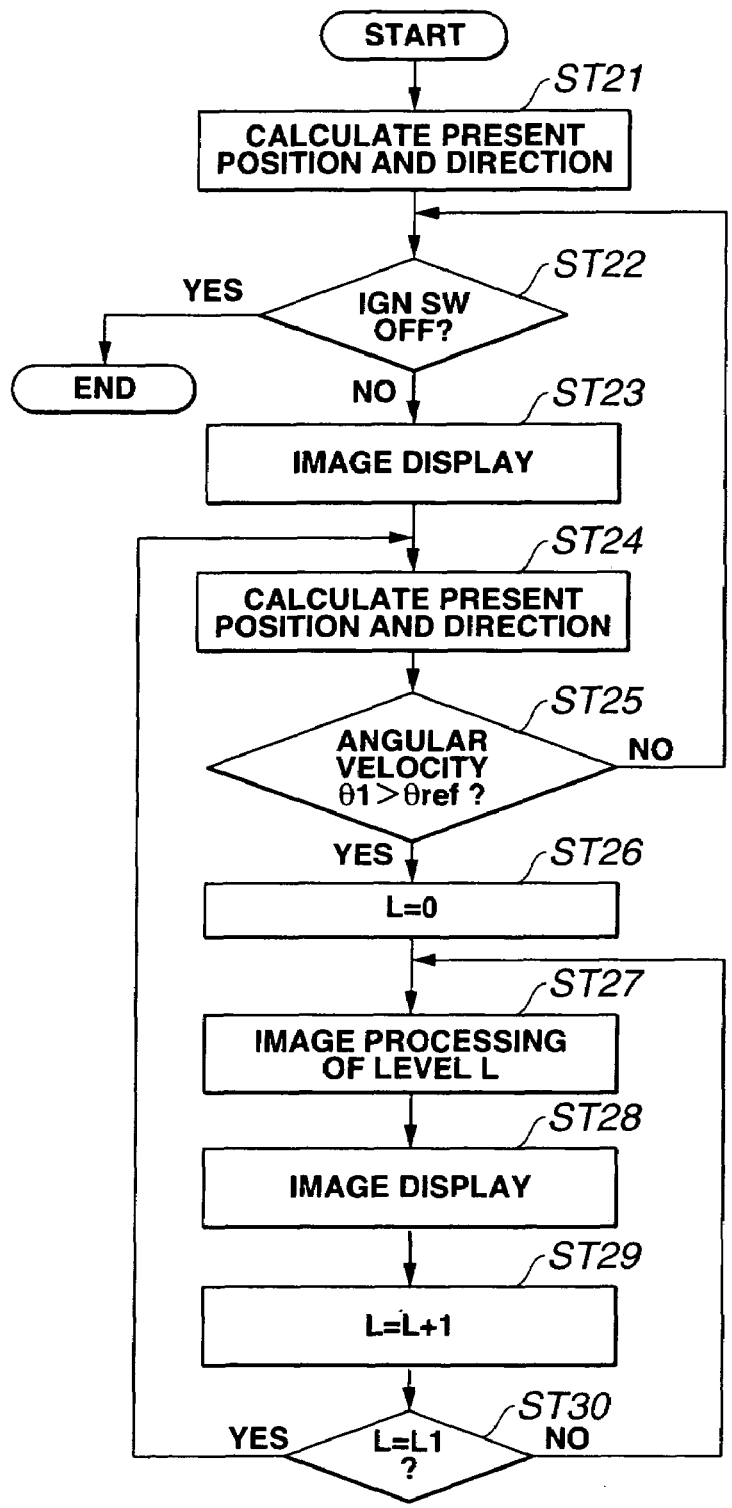
FIG. 15 is an operational flowchart representing a procedure of vehicular display apparatus in the fourth preferred embodiment according to the present invention.

FIG. 15 shows a processing flowchart of the fourth preferred embodiment for explaining the operation of vehicular display apparatus 1 in the fourth embodiment.

At a step ST21, present position measuring unit 2 detects the running position of the vehicle (it is natural that the traveling direction thereof is measured). At a step ST22, display controller 6 receives the ignition switch position information to determine whether the ignition switch is turned off. If the ignition switch is not turned off (No) at step ST22, the routine goes to a step ST22. If the ignition switch is turned off (Yes) at step ST22, the routine is ended. At step ST23, display image data generating section 14 of display controller 6 carries out such a process as to superimpose the present position of the vehicle (arrowed mark) on the region of the road map data which surrounds the running point of place of the vehicle stored in road map data storing section 22 and displays the arrowed mark superimposed road map data image on the image screen of display 7.

Then, at the next step ST24, velocity calculating section 11 derives the rotation angle θ1 of the vehicle within the predetermined period of time on the basis of the data on the present position of the vehicle obtained by present position measuring unit 2. Then, the routine goes to a step ST24. At step ST24, comparing section 12 compares reference value θref preset in calculating section 12 with rotation angle θ1 of the vehicle to determine whether θ1>θref. If θ1>θref (Yes) at step ST25, the routine goes to a step ST26. At step ST26, display form adjusting section 13 carries out such a process as to turn a count value of L indicating a level of an image processing to 0 (L=0). Then, the image of level L is displayed on image screen of level L at the next step ST27.

It is noted that level L is a level indicating a magnitude of the superimposition of two images, when L=0, the image to be displayed is the whole road map data image before the traveling direction of the vehicle is changed, and, when L=L1, the image to be displayed is the whole road map data image after the traveling direction of the vehicle is changed. Suppose now that L1=5. In this case, when L=0, an superimposition ratio of the road map data image before the traveling direction of the vehicle is changed to that after the traveling direction thereof is changed is 10:0. When L=1, the same ratio indicates 7:3. When L=2, the same ratio indicates 5:5. When L=3, the same ratio indicates 3:7. When L=4, the same ratio indicates 0:10.

Next, at a step ST27, display form adjusting section 13 of display controller 6 carries out such a process as to generate the image of level L (at this time, L=0). Then, at the next step ST28, the generated road map data image on the image screen of display 7. Thereafter, the value of L is incremented by one (L=L+1) at a step ST29. The above-described process from step ST27 to step ST29 is repeated until L=L1 at a step ST30. If L=L1 (in this case, L1=5) at step ST30 (Yes), the routine jumps to step ST24 and the same series of processes of steps ST24 to ST30 are repeated if θ1>θref at step ST25.

Figure 16:
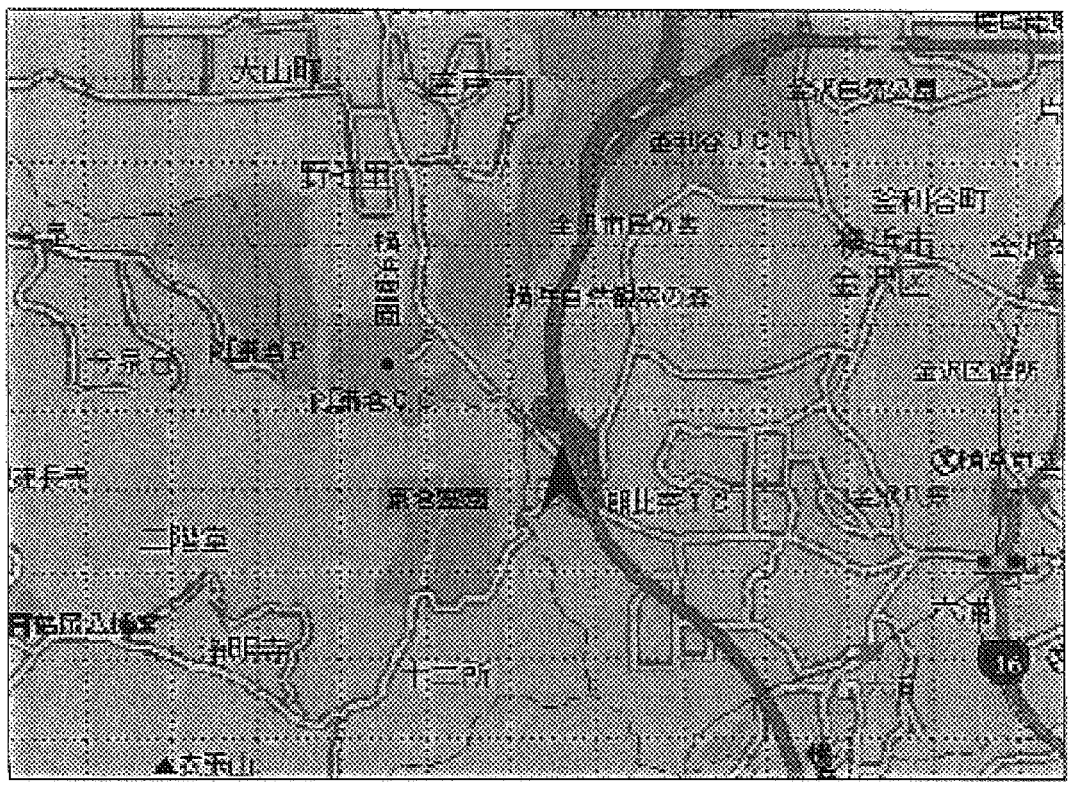
FIG. 16 is a photograph representing a display example of the displayed image of display when a ratio of a road map data image before a rotation of the road map data image to that after the rotation thereof is 10:0.
Figure 17:
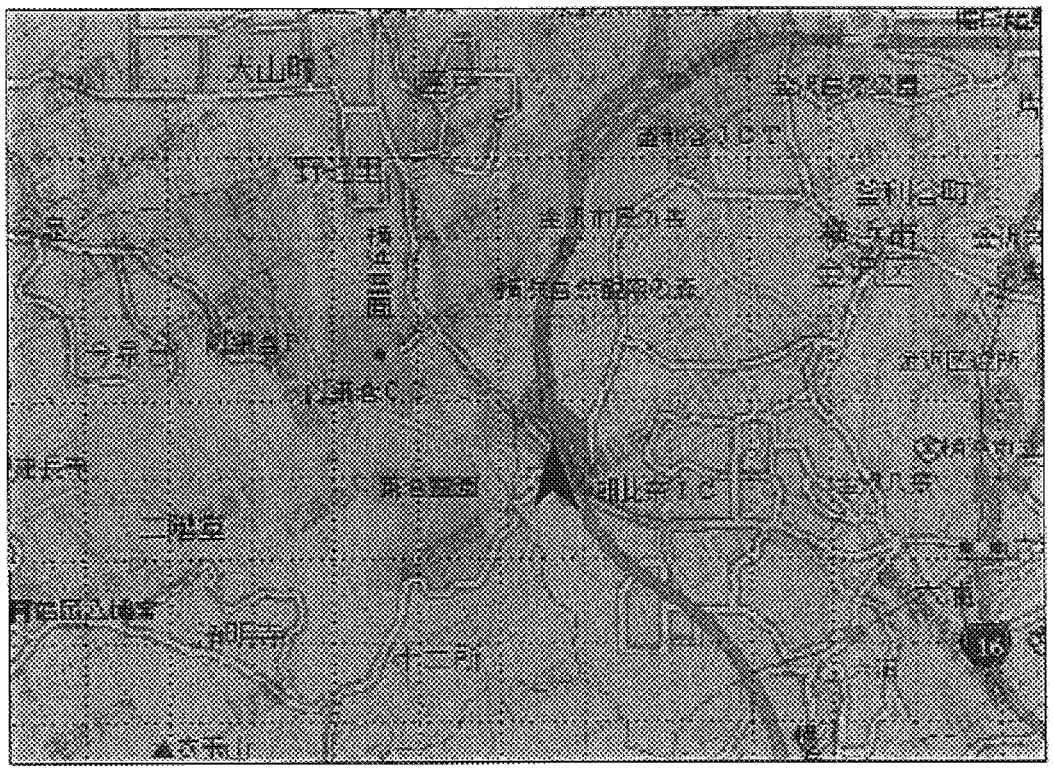
FIG. 17 is a photograph representing a display example of the displayed image of display when the ratio of the road map data image before the rotation of the road map data image to that after the rotation thereof is 7:3.
Figure 18:
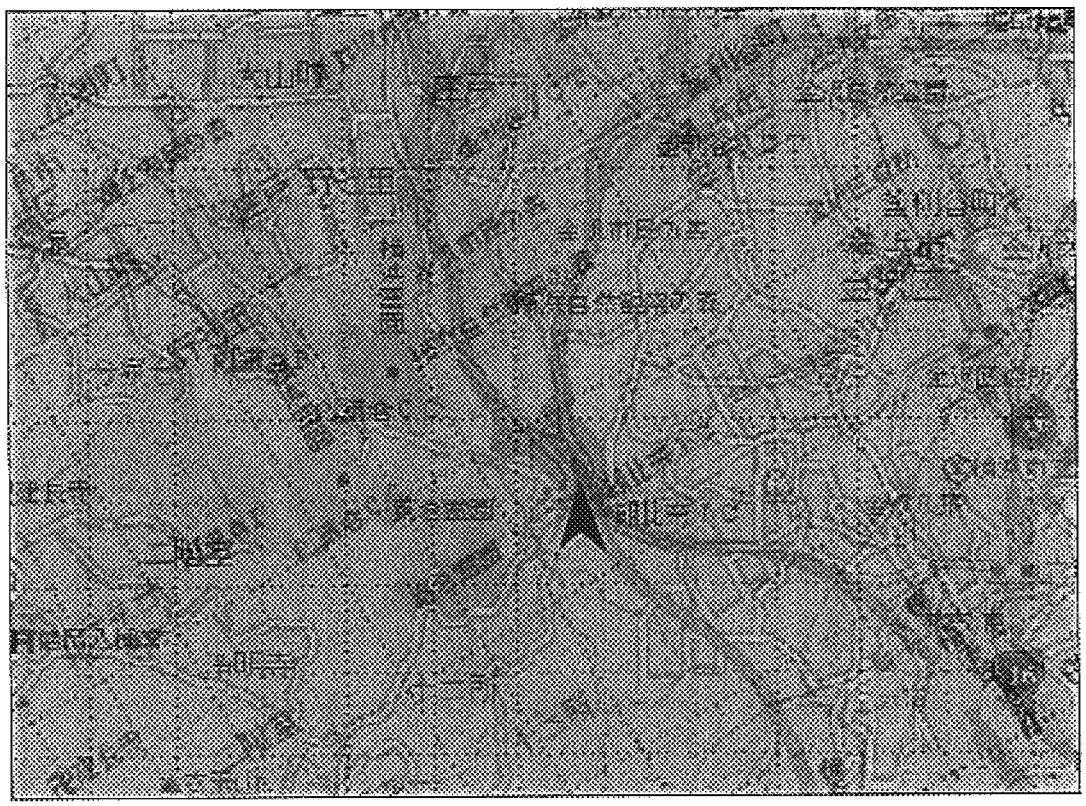
FIG. 18 is a photograph representing a display example of the displayed image of display when the ratio of road map data image before the rotation of the road map data image to that after the rotation thereof is 5:5.
Figure 19:
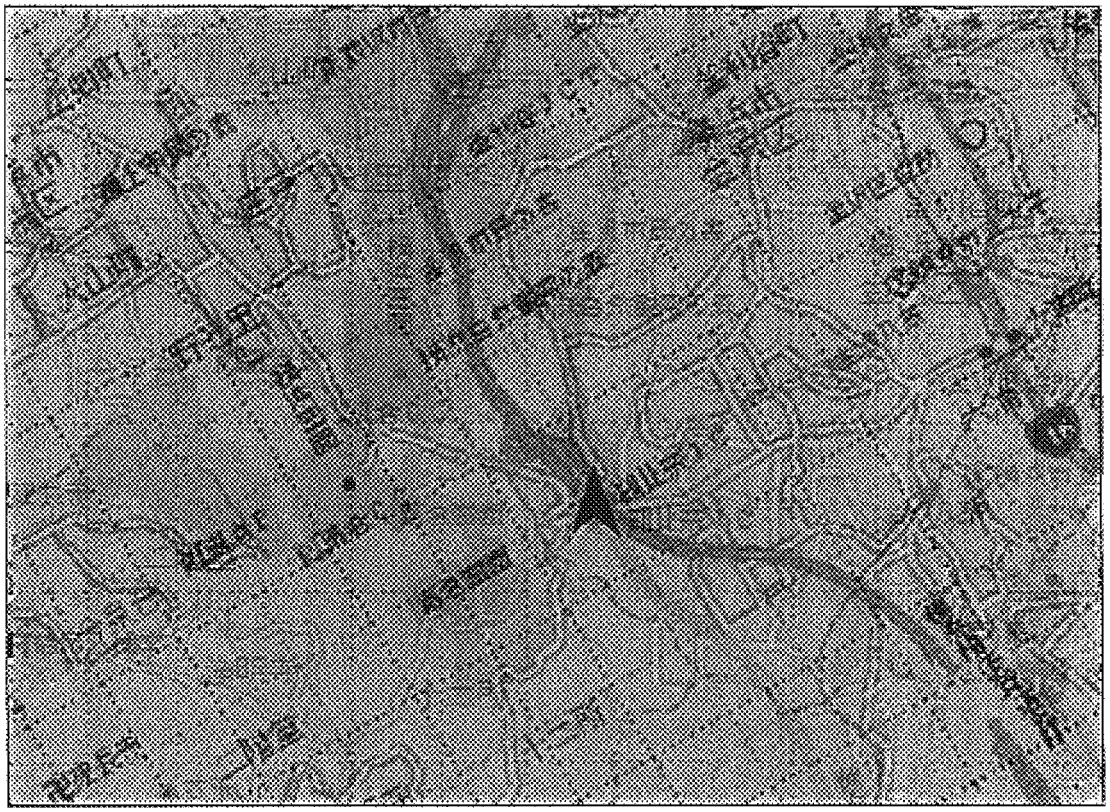
FIG. 19 a photograph representing a display example of the displayed image of display when the ratio of road map data image before the rotation of the road map data image to that after the rotation thereof is 3:7.
Figure 20:
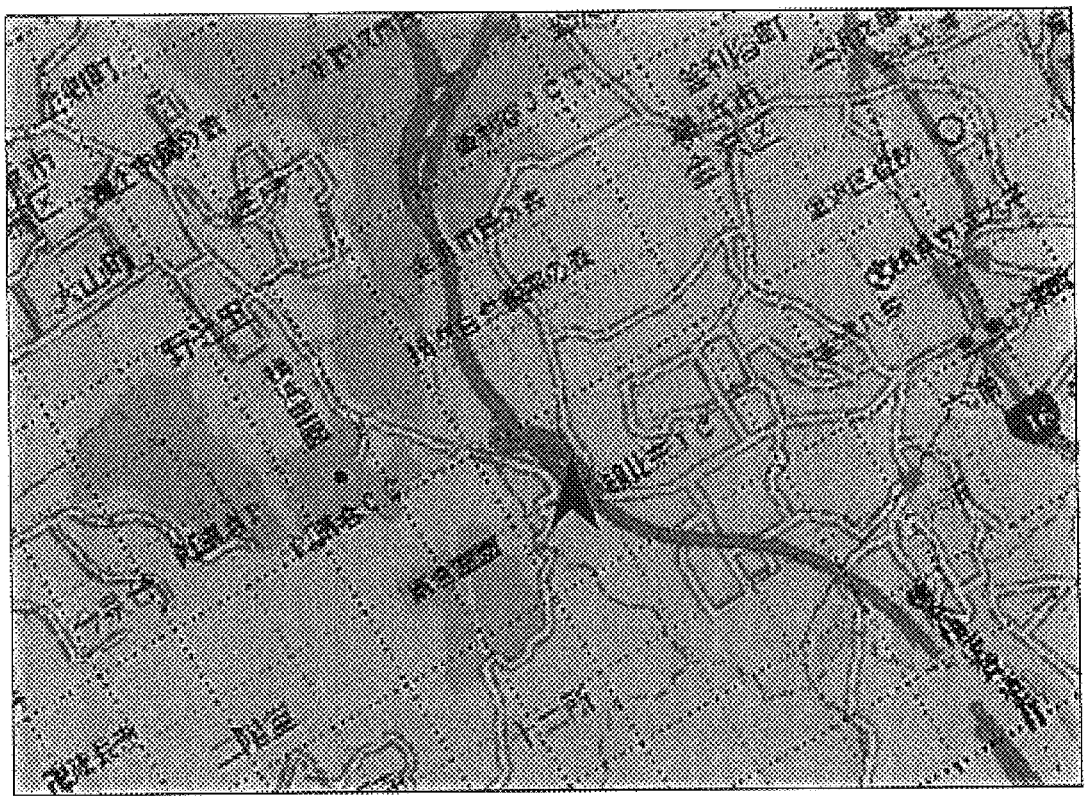
FIG. 20 is a photograph representing a display example of the displayed image of display when the ratio of road map data image before the rotation of the road map data image to that after the rotation thereof is 0:10.

FIGS. 16, 17, 18, 19, and 20 show series of display examples of the image screen of display 7 for explaining a variation pattern of the road map data image in the case of the display form adjustment carried out in the fourth embodiment described above. In details, FIG. 16 shows the result of image processing when L=0 (viz., the superimposition ratio of the road map data image before the rotation thereof to that after the rotation thereof is 10:0). FIG. 17 shows the result of image processing when L=1 (the ratio thereof is 7:3). FIG. 18 shows the result of image processing when L=2 (the same ratio is 5:5). FIG. 19 shows the result of image processing when L=3 (the same ratio is 3:7). FIG. 20 shows the result of processing when L=4 (the same ratio is 0:10).

As appreciated from FIGS. 16 through 20, the image is displayed on display 7 in such a manner that the superimposition ratio between two images (image before the rotation thereof and that after the rotation thereof) is gradually varied while the turn of the vehicle is started and, then, the turn of the vehicle is ended.

As described above, in the fourth embodiment of vehicular display apparatus 1 according to the present invention, when the traveling direction of the vehicle is changed, the superimposition between the road map data image before and after this direction change is carried out and the superimposition ratio is set to be gradually varied. Therefore, the vehicular occupant can visually recognize the road map data image displayed on display 7 with a pleasant feeling. Consequently, the troublesome feeling that the vehicular occupant gives can be relieved.

Next, the fifth preferred embodiment of vehicular display apparatus 1 will be described below.

In the fifth embodiment, such a process as to rotate the road map data image is carried out in such a manner as to synchronize the rotation of the road map data image displayed on the image screen of display 7 with a variation of a field of view for a vehicular forward zone of the vehicle that the vehicular occupant visually recognizes.

Hence, the road map data image can be displayed without giving an unpleasant feeling to the vehicular occupant. The structure of vehicular display apparatus 1 in the fifth embodiment has the same structure as the block diagram of FIG. 1 described above.

Figure 21:
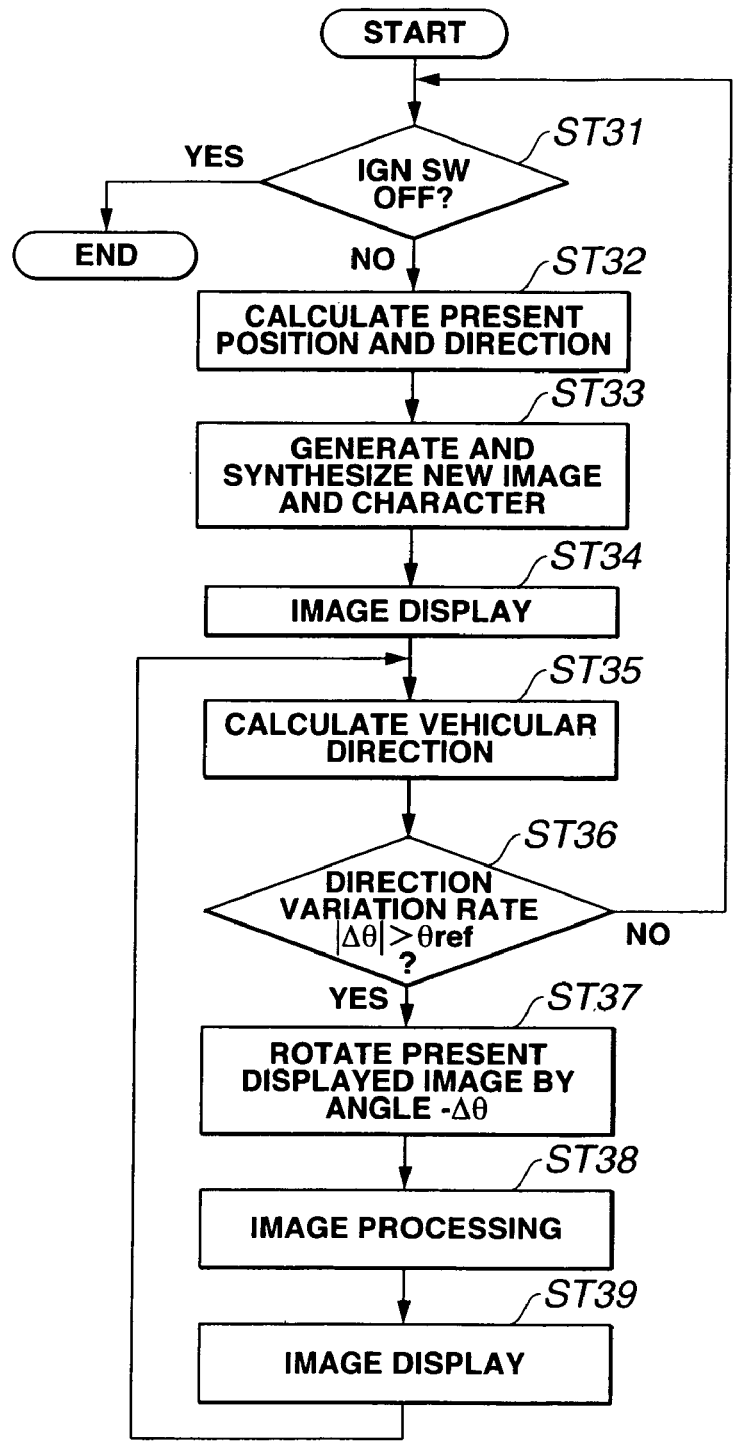
FIG. 21 is an operational flowchart representing a procedure carried out in the vehicular display apparatus in the fifth preferred embodiment according to the present invention.

FIG. 21 shows a processing flowchart carried out in the fifth embodiment.

The operation of the fifth embodiment will be described with reference to FIG. 21.

In FIG. 21, display controller 6 determines whether the ignition switch of the vehicle is turned off at a step ST31. At a step ST32, the present position measuring unit 2 measures the present position of the vehicle and traveling direction thereof.

At a step ST33, display controller 6 superimposes the arrowed mark representing the present position of the vehicle and direction thereof on the region of the road map data image which surrounds the running position of the vehicle and generates the image synthesized with character data representing a name of place or so forth. Then, at the next step ST34, the display controller 6 carries out such a process as to display the generated image on display 7.

Next, at a step ST35, display controller 6 carries out such a process as to calculate the traveling direction (vehicular direction) of the vehicle on the basis of the data on the traveling direction of the vehicle obtained by gyro sensor 4. At a step ST36, display controller 6 determines whether a magnitude of the turning angle $\Delta\theta$ of the vehicle for a predetermined period of time is larger (wider) than reference value $\theta$ref preset in calculating section 12. If $|\Delta\theta|>\theta$ref (Yes) at step ST36, the routine goes to a step ST37. At step ST37, display controller 6 carries out such a process as to rotate the road map data image displayed on display 7 by the angle of $\Delta\theta$ in a reverse direction to the turning direction of the vehicle.

At this time, since the turning angle is measured on the basis of the data derived by gyro sensor 4, the display image onto display 7 can be generated at an earlier timing than such as a process as to read a new road map data image and as to synthesize the characters. Hence, the road map data image can be rotated in synchronization with the turn of the vehicle.

Then, the image treated under the image processing is added with the process of varying appropriately the image contrast, brightness, saturation, and focus during the rotation of the road map data image and, thereafter, the image processed road map data image is displayed on the image screen of display 7 at steps ST38 and ST39.

As described above, in the fifth embodiment, when the traveling direction of the vehicle is changed, the rotation of the road map data image to be displayed on display 7 is synchronized with the field of view for the actual vehicular forward zone that the vehicular occupant visually recognizes. The vehicular occupant can visually recognize the road map data image displayed on display 7 without giving the unpleasant feeling.

Next, the sixth preferred embodiment of vehicular display apparatus 1 according to the present invention will be described below.

In the sixth embodiment, it is possible to adjust the rotation of the road map data image to be displayed on display 7 on the basis of a predicted data derived according to a result of such a prediction as a traveling route of the vehicle.

Figure 22:
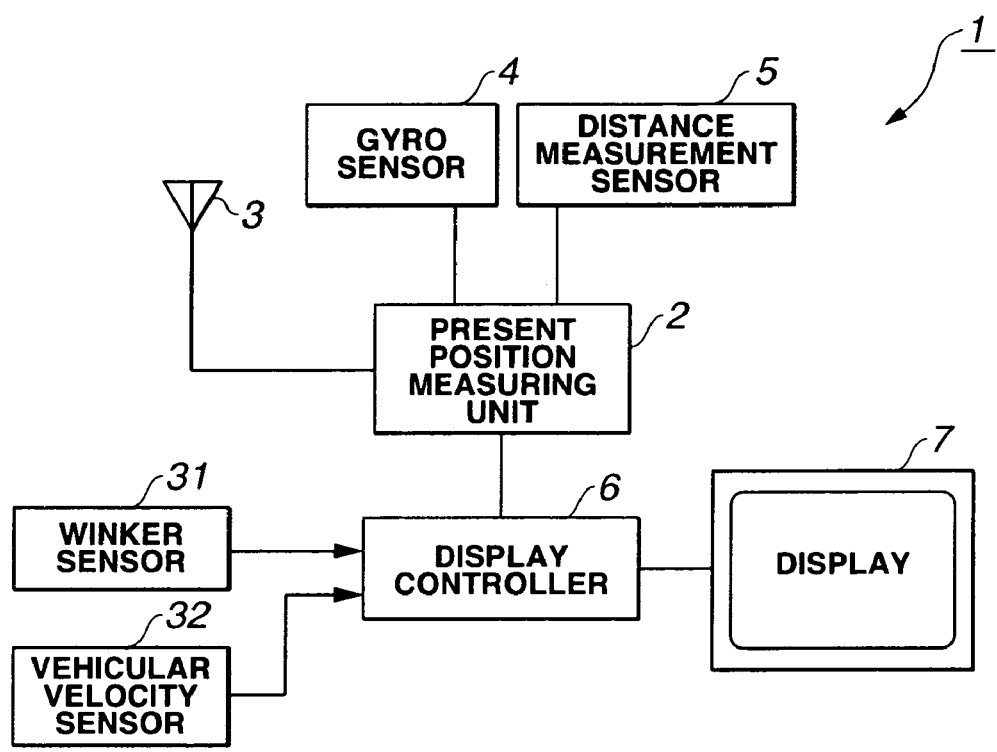
FIG. 22 is a block diagram of the structure of the vehicular display apparatus in the sixth preferred embodiment according to the present invention.

FIG. 22 shows a block diagram representing the structure of vehicular display apparatus in the sixth preferred embodiment.

As appreciated from FIG. 22, vehicular velocity display apparatus 1 includes: present position measuring unit 2, GPS antenna 3, gyro sensor 4, distance sensor 5, display controller 6, and display 7 in the same way as the vehicular display apparatus shown in FIG. 1. In the sixth embodiment, a winker sensor 31 to detect a drive state of an winker of the vehicle and a vehicular velocity sensor 32 to detect a velocity of the vehicle.

Figure 23:
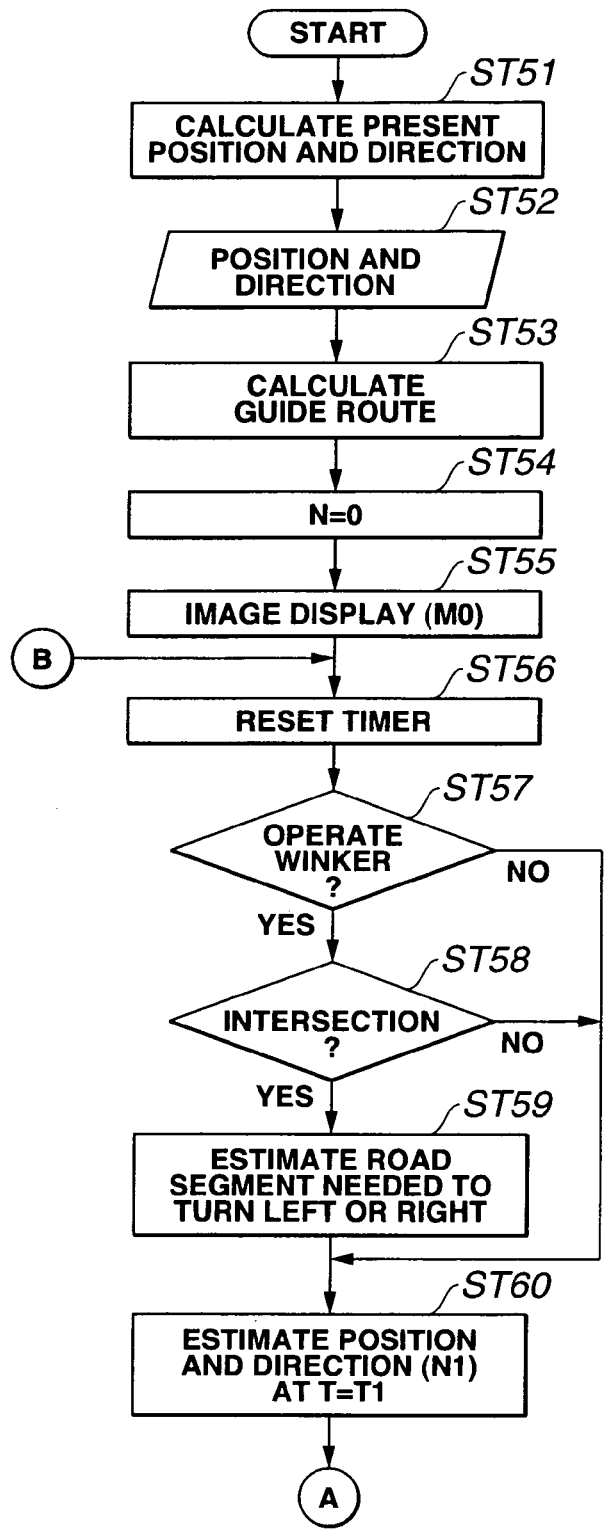
FIGS. 23, 24, and 25 are integrally a procedure flowchart executed in the vehicular display apparatus of the sixth preferred embodiment shown in FIGS. 1 and 22.
Figure 24:
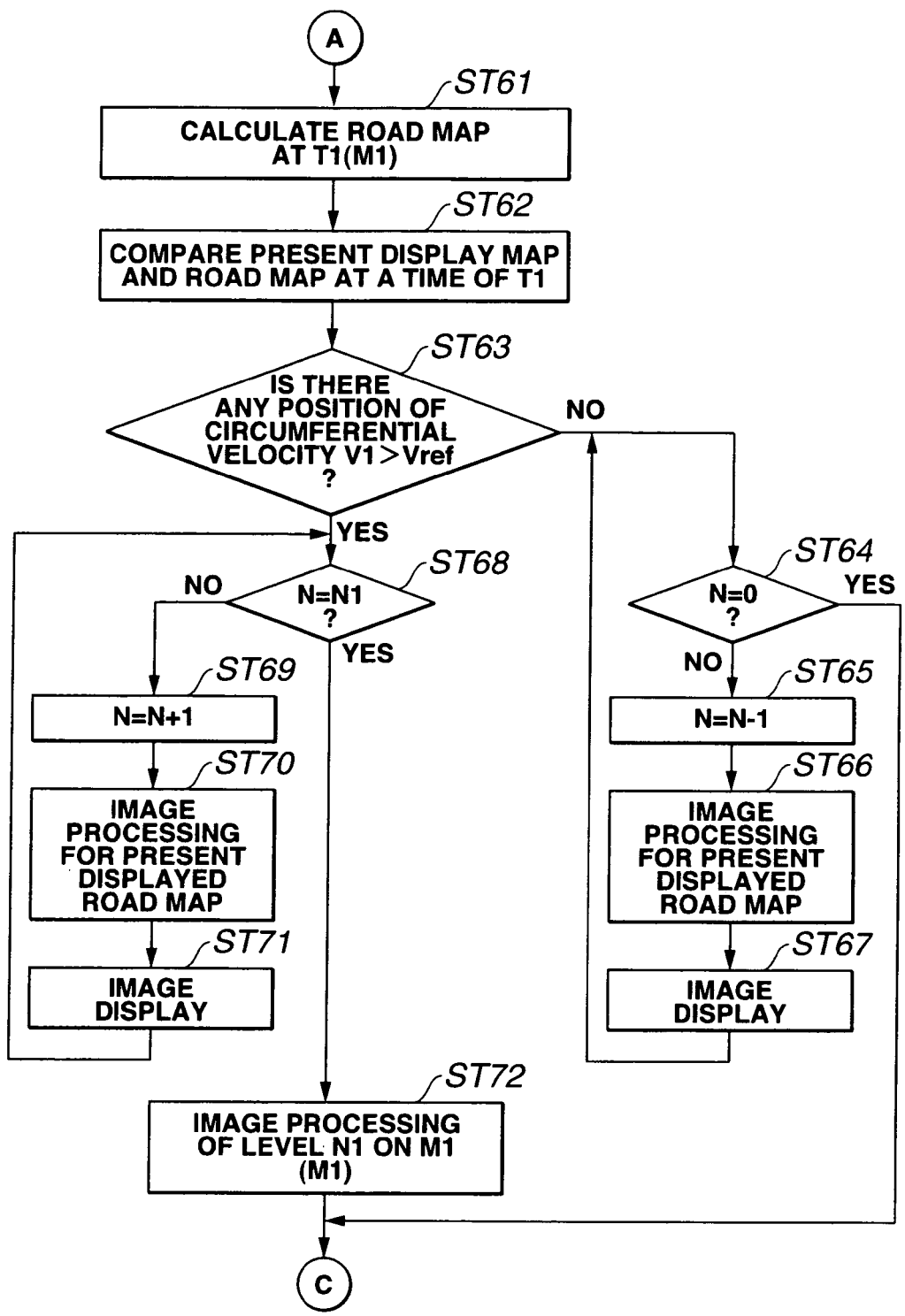
Figure 25:
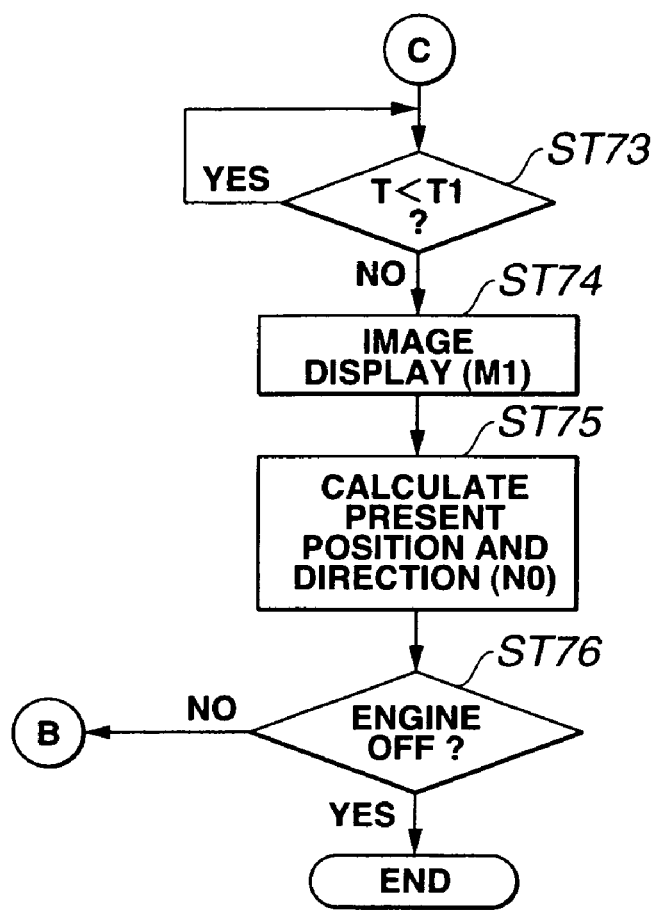

The operation of vehicular display apparatus 1 in the sixth preferred embodiment will be described with reference to a series of operational flowcharts shown in FIGS. 23 through 25.

Present position measuring unit 2 shown in FIG. 22 measures the position of the vehicle on the basis of data obtained from the measuring satellites through GPS antenna 3 and the data of the traveling direction and running distance of the vehicle obtained from gyro sensor 4 and distance sensor 5.

Next, when the vehicular driver inputs a destination to which the vehicle is to be reached on display controller 6 at a step ST52. At a step ST53, display controller 6 carries out such a process as to calculate a guide route to guide the vehicle from the present position to the destination.

Then, the image display processing is carried out with a count value N set as N=0 at a step ST54, the count value N representing a level of the image processing. Then, at a step ST55, the image processing of level of N=0 is carried out and the image processed road map data image is displayed. It is noted that the display image, at this time, is M0.

Next, a timer (not shown) provided within display controller 6 is reset at a step ST56. The present time T is set as T=0. Display controller 6 determines whether the winker of the vehicle is presently operated at a step ST57 from a signal of winker sensor 31. If the winker is being operated (Yes at step ST57), the routine goes to a step ST58. At step ST58, display controller 6 determines whether a traffic intersection is present in the traveling direction of the vehicle on the basis of data on the guide route. If the traffic intersection is present (Yes at step ST58), the routine goes to a step ST59. Display controller 6 carries out such a process as to estimate a road to which the vehicle turns right or left.

Next, at a step ST60, display controller 6 estimates the position of the vehicle and direction thereof at a future time T1 after an elapse of a predetermined period of time from the present time. At a step ST61, display controller 6 carries out such a process as to derive the road map data image at the time of T1. It is noted that the level of image processing at a time T1 is N1 and the image to be displayed on display 7 is M1.

Display controller 6 compares road map data image M0 displayed on display 7 with road map data image M1 at a future time T1 (step ST62). When the vehicle is turned at an ordinary velocity, display controller 6 determines whether a position of the road map data image at which the corresponding circumferential velocity V1 of road map data image is larger than reference value Vref (for example, Vref=50 mm/s) at a step ST63.

Consequently, if display controller 6 determines that the position of the road map data image at which circumferential velocity V1 is larger than reference value Vref (No) at step ST63 is present, the routine goes to a step ST64. At step ST64, display controller 6 determines whether image processing level N is 0 (N=0). In this case, since N=0 (Yes at a step ST64), the routine jumps to a step ST73. At step ST73, display controller 6 carries out such a process as to display image M1 at a time point at which the present time T has reached to the time T1. Thus, display controller 6 calculates the present position and traveling direction of the vehicle at a step ST75. If an engine of the vehicle is turned off (No at a step ST76), then, the processing is repeated from a step ST56. That is to say, if circumferential velocity V1 on a future road map data image is smaller than reference value Vref, display controller 7 does not carry out such a process as to variably modify the display form such as the image contrast but carries out such a process as to display image M1 corresponding to a time point at which it reaches to time point T1.

On the other hand, it is predicted that the position of the road map data image at which circumferential velocity V1 of road map data image is larger than reference value Vref (V1>Vref at step ST63), the routine goes to a step ST68. At step ST68, if image processing level N has reached to image processing level N1 at time point T1 (Yes at step ST68), the routine goes to a step ST72. At step ST72, such a process as to add display image M1 at time point T1 to image processing level N1 is carried out.

Thereafter, when the time has reached to T1 (Yes at step ST73), display controller 6 displays display image M1 on display 7 at a step ST74. At a step ST75, display controller 6 calculates the present position and traveling direction of the vehicle. Unless the engine is turned off (No at step ST76), the routine jumps to and returns to step ST56.

In this state, since the time has reached to T1 and the vehicle has ended to turn the intersection, No is an answer at step ST63. If No at step ST63, the routine goes to step ST64. Since, at this time, image processing level "N" is N=N1 (No at step ST64), the routine goes to a step ST65. At step ST65, image processing level is decremented by one (N=N−1). Then, at a step ST66, such an image processing as contrast adjustment is carried out. At the next step ST67, the image display is carried out. Then, at a time point at which image processing level "N" is N=0, the road map data image at the time point T1 (newly set time T1) is displayed (step ST74). In addition, if the engine is turned off (Yes at a step ST76), the processing shown in FIGS. 23, 24, and 25 is ended.

As described above, in a case where at future time point T1, it is predicted that the position on the road map data image at which corresponding circumferential velocity V1 of road map data image is larger than reference value Vref, such a process can be carried out as to relieve the troublesome feeling given to the vehicular occupant by previously adjusting the contrast, brightness, and focus on the road map data image before the time has reached to time t1. The road map data image displayed on display 7 can be modified in more natural sense of feeling. Consequently, the visibility of the image screen of display 7 for the vehicular driver can remarkably be improved.

In vehicular display apparatus in the sixth embodiment described above, the guide route can be derived from the present position of the vehicle and from the data on the destination and winker sensor 31 and vehicular velocity sensor 32 can be used to estimate whether the vehicle is to turn the intersection at a future time T1.

Therefore, both of timings at which the vehicle has turned in response to the steering operation by the vehicular driver and at which the road map data image on display 7 can appropriately be adjusted.

FIGS. 26A, 26B, 26C, and 26D show explanatory views representing rotational timings of the vehicular turn and road map data image.

FIG. 26A shows a timing chart representing a vehicular turn and rotation timing of rotation of road map data image.

Figure 26B:
FIGS. 26B, 26C, and 26D are timing charts representing start and end of the rotation of each display form varied road map data image.
Figure 26C:
Figure 26D:

FIGS. 26B, 26C, and 26D are timing charts representing various timing charts representing various timing patterns when the road map data image is rotated.

As shown in FIGS. 26A, the vehicle starts the turning at a time point of t1 and ends the turning at a time point of t2. In the example shown in FIG. 26B, the timings of the rotation start and rotation end are synchronized with the turning of the vehicle. In addition, the image processing is added to the road map data image at a time R1 immediately before the start of rotation on the road map data image and the contrast adjustment and brightness adjustment are carried out. At a time R2 immediately after the end of rotation, the contrast and brightness are returned to original states.

In the example of FIG. 26C, the start timing of rotation of the road map data image is synchronized with the turn of the vehicle and the image processing is added to the road map data image at a time R3 immediately before the start of the turning (rotation) of the road map image. In addition, at a time point of t3 slightly immediately before the time point t2 which is a time point at which the turn of the vehicle is ended, the rotation of the road map data image is ended. At a time R4, the road map data image under the image processing is returned to the original state.

In the example of FIG. 26D, the image processing is started synchronizing the time point t1 at which the turn of the vehicle is started and, after the elapse of the time R5, the road map data image is rotated. In addition, such a process as to return the road map data image to the original state is carried out at the time point t2 at which the turn of the vehicle is ended.

Then, as shown in FIG. 26B, in a case where the timing at which the start of turn of the vehicle is made coincident with that at which the start of rotation of the road map data image and that at which the turn of the vehicle is ended made coincident with that at which the end of rotation of the road map is ended, respectively, the turn of the vehicle is made coincident with the rotation of the road map data image. Thus, the unpleasant feeling that the vehicular occupant gives is reduced and it is suitable when the traveling direction of the vehicle is varied along the path.

In addition, since, in the case of FIG. 26C, the road map data image is switched to the display for a straight run at a time point at which the turning of the vehicle is substantially ended in such a case when the vehicle turns right or left on the traffic intersection. Hence, it becomes possible for the vehicular driver to anticipate the subsequent traveling direction. Consequently, the display method shown in FIG. 26C is suitable when the vehicle turns left or right at the traffic intersection. In either the case of FIG. 26D or FIG. 26C, the display image on display is changed to that used for the rotation there of and road map information quantity on the display image is reduced. Hence, the vehicular driver's attention is not paid to the displayed image on display 7 more than necessary. Consequently, a driving safety at the vehicular run on any traffic intersection can be improved. It is noted that, in the case of FIG. 26D, the display of road map data image is switched in synchronization with the actual start or end of the turn of the vehicle. Hence, it is unnecessary to predict the future traveling direction of the vehicle.

The entire contents of Japanese Patent Application No. 2000-346694 (filed in Japan on Nov. 14, 2000) are herein incorporated by reference.

Modifications and variations of the embodiments described above will occur to those skilled in the art in the light of the above teachings. The scope of the invention is defined with reference to the following claims.

INDUSTRIAL APPLICABILITY

The present invention relates to the display apparatus and method for the automotive vehicle such as, so-called, car navigation system and method, in which the road map data image which meets the vehicular driver's drive feeling of the vehicle can be displayed and the visibility of display can be improved. Basically, in the vehicular display apparatus according to the present invention, when the road map data image is rotated along with the turn of the vehicle on the image screen of display, the display form is modified in such a manner that the display form on the region of the road map data image which is near to the displayed present position of the vehicle is made different from that on the other region thereof which is remote from the displayed present position of the vehicle.

The invention claimed is:

1. A display apparatus for an automotive vehicle, comprising:
   an image display section;
   a present position measuring section that measures a present position of the vehicle;
   a road map storing section that stores a road map data image;
   a superimpose processing section that superimposes a mark representing the present position of the vehicle on the road map data image to display the road map data image on which the mark is superimposed through the image display section; and
   display control section that rotates the road map data image displayed on an image screen of the image display section in accordance with a traveling direction of the vehicle and varies a display form of the displayed road map data image between a region of the road map data image which is near to a displayed position at which the vehicle is present and another region of the road map data image which is remote from the displayed position thereof when rotating the road map data image on the image screen displayed on the image display section, wherein
   the displayed road map data image within the region of the road map data image which is near to the displayed position at which the vehicle is present is clearer than the other region of the road map data image which is remote from the displayed position at which the vehicle is present, and
   the display apparatus further comprises a clearness adjusting section that adjusts the clearness of the displayed image in terms of at least one of image contrast, brightness, saturation, and focus.

2. A display apparatus for an automotive vehicle, as claimed in claim 1, further comprising a display form setting table storing a variation characteristic of the display form and wherein the display control section adjustably varies the display form on the image screen of the image display section on the basis of the variation characteristic preset in the display form setting table.

3. A display apparatus for an automotive vehicle, as claimed in claim 2, wherein the variation characteristic in the display form setting table is preset with any one of the angular velocity, circumferential velocity, a distance from a center of the rotation of the road map data image and a visual sense variation rate as a parameter.

4. A display apparatus for an automotive vehicle, as claimed in claim 1, wherein, when rotating the road map data image displayed on the image screen of the image display section, the display control section controllably displays the road map data image on the image screen of the image display section in such a manner that contents of the road map data image in the region of the road map data image which is near to the displayed position at which the vehicle is present are displayed in details and the contents thereof in the other region thereof which is remote from the position thereat are displayed in a simplification form.

5. A display apparatus for an automotive vehicle, as claimed in claim 4, wherein the display control section determines whether the other region of the road map data image is to be displayed in the simplification form with any one of an angular velocity of the rotating road map data image, a circumferential velocity of at least a given spot on the other region, a distance of the given spot from a rotation center thereof, and a visual sense variation rate as a parameter.

6. A display apparatus for an automotive vehicle, as claimed in claim 1, wherein the display control section varies the display form in such a manner as to superimpose the road map data image after the traveling direction of the vehicle is changed on that before the traveling direction of the vehicle is changed when the direction of the vehicle is changed to rotate the road map data image and to vary gradually a superimposition ratio of the road map data image after the traveling direction of the vehicle is changed to the road map image data before the road map data image is changed from 10:0 to 0:10 as the time has passed.

7. A display apparatus for an automotive vehicle, as claimed in claim 1, wherein the display control section varies the display form in such a manner as to synchronize a rotation of a field of view in a driving direction of the vehicle with that of the road map image data for the road map image to be displayed on the image screen of the road map data image.

8. A display apparatus for an automotive vehicle as claimed in claim 1, wherein the display control section differentiate the display form of the displayed road map data image between the region of the road map data image which is near to the displayed position at which the vehicle is present and another region of the road map data image which is remote from the displayed position thereof when rotating the road map data image on the image screen displayed on the image display section.

9. A display apparatus for an automotive vehicle, as claimed in claim 1, wherein the display control section comprises a vehicular traveling route direction predicting section that predicts a direction of a traveling route of the vehicle and wherein, when the direction of the traveling route of the vehicle is varied through an angle equal to or wider than a predetermined angle, the display control section rotates the road map data image with the image of the vehicle as a center on the basis of a predicted data on the direction of the traveling route of the vehicle varied through an angle equal to or wider than the predetermined angle.

10. A display apparatus for an automotive vehicle, as claimed in claim 9, wherein the vehicular traveling route direction predicting section predicts the direction of the forwarding route of the vehicle on the basis of at least one of the following data: (a) a comparison data comparing the present traveling direction of the vehicle read from the road map data image with a forward bend situation of the present traveling direction; (b) a data on a preset guide route; and (c) a data on a winker operation of the vehicle.

11. A display apparatus for an automotive vehicle, as claimed in claim 9, wherein the display control section varies the display form of the displayed image screen at an earlier timing than a turning start timing of the vehicle.

12. A display apparatus for an automotive vehicle, as claimed in claim 9, wherein the display control section returns the display form of the displayed image screen on the image display section to an original state at a time point earlier than a timing at which the vehicle has ended a turning.

13. A display apparatus for an automotive vehicle, as claimed in claim 9, wherein the display control section varies the display form of the displayed road map data image on the image screen of the image display section after a timing at which the vehicle starts to turn and returns the varied display form to the original state after a timing at which the vehicle has ended the turning.

14. A display apparatus for an automotive vehicle as claimed in claim 1, wherein the display control section further comprises:
- a velocity calculating section that calculates one of a circumferential velocity of at least one given spot of a place on the displayed image screen and an angular velocity thereof on the basis of a turning velocity of the vehicle detected by the present vehicle position measuring section and a display magnification displayed on the image screen of the image display section; and
- a display form adjusting section that adjusts a display form of the displayed image screen of the image display section according to a magnitude of at least one of the circumferential velocity and the angular velocity calculated by the velocity calculating section.

15. A display apparatus for an automotive vehicle, as claimed in claim 2, wherein the display control section varies the display form in such a manner as to synchronize a rotation of a field of view in a traveling direction of the vehicle with that of the road map image data for the road map image to be displayed on the image screen of the road map data image.

16. A display apparatus for an automotive vehicle, as claimed in claim 14, wherein the display control section comprises a vehicular traveling route direction predicting section that predicts a direction of a traveling route of the vehicle and wherein, when the direction of the traveling route of the vehicle is varied through an angle equal to or wider than a predetermined angle, the display control section rotates and displays the road map data image with the image of the vehicle as a center on the basis of a predicted data on the direction of the traveling route of the vehicle varied through an angle equal to or wider than the predetermined angle.

17. A display apparatus for an automotive vehicle, comprising:
- image display means;
- present position measuring means for measuring a present position of the vehicle;
- road map storing means for storing a road map data image;
- superimpose processing means for superimposing a mark representing the present position of the vehicle on the road map image to display the road map data image on which the mark is superimposed through the image display section; and
- display control means for rotating the road map data image displayed on an image screen of the image display section in accordance with a traveling direction of the vehicle and for varying a display form of the displayed road map data image between a region of the road map data image which is near to a displayed position at which the vehicle is present and another region of the road map data image which is remote from the displayed position thereof when rotating the road map data image on the image screen displayed on the image display section, wherein
- the displayed position at which the vehicle is present at which the vehicle is present is clearer than the other region of the road map data which is remote from the displayed position at which the vehicle is present, and
- the display apparatus further comprises clearness adjusting means for adjusting the clearness of the displayed image in terms of at least one of image contrast, brightness, saturation, and focus.

18. A display method for an automotive vehicle, comprising:
- providing an image display section;
- measuring a present position of the vehicle;
- storing a road map data image;
- superimposing a mark representing the present position of the vehicle on the road map data image to display the road map data image on which the mark is superimposed through the image display section;
- rotating the road map data image on an image screen of the image display section in accordance with a traveling direction of the vehicle while displaying the road map data image on an image screen of the image display section;
- varying a display form of the displayed road map data image between a region of the road map data image which is near to a displayed position at which the vehicle is present and another region of the road map data image which is remote from the displayed position thereof while rotating the road map data image on the image screen of the image display section, wherein the displayed road map data image within the region of the road map data image which is near to the displayed position at which the vehicle is present is clearer than the other region of the road map data image which is remote from the displayed position at which the vehicle is present; and
- adjusting the clearness of the displayed image in terms of at least one of image contrast, brightness, saturation, and focus.

* * * * *